(12) United States Patent
Suzuki et al.

(10) Patent No.: US 8,363,975 B2
(45) Date of Patent: Jan. 29, 2013

(54) IMAGE DETERMINING DEVICE, IMAGE DETERMINING METHOD, AND PROGRAM

(75) Inventors: Masaru Suzuki, Tokyo (JP); Masami Ogata, Kanagawa (JP); Kazuhiko Ueda, Kanagawa (JP)

(73) Assignee: Sony Corporation, Tokyo (JP)

(*) Notice: Subject to any disclaimer, the term of this patent is extended or adjusted under 35 U.S.C. 154(b) by 1211 days.

(21) Appl. No.: 12/187,237

(22) Filed: Aug. 6, 2008

(65) Prior Publication Data

US 2009/0041349 A1 Feb. 12, 2009

(30) Foreign Application Priority Data

Aug. 7, 2007 (JP) ................. P2007-205801

(51) Int. Cl.
*G06K 9/00* (2006.01)
*G06K 9/32* (2006.01)
*G06K 9/38* (2006.01)
*G06K 9/40* (2006.01)
*H04N 7/01* (2006.01)
*H04N 11/20* (2006.01)

(52) U.S. Cl. ........ 382/272; 382/168; 382/254; 382/275; 382/299; 348/441; 348/445; 348/458; 348/459

(58) Field of Classification Search ............... 382/168, 382/254, 272, 275, 299; 348/441, 445, 458, 348/459

See application file for complete search history.

(56) References Cited

U.S. PATENT DOCUMENTS

| | | | |
|---|---|---|---|
| 7,031,551 B2* | 4/2006 | Yano et al. | 382/275 |
| 7,403,235 B2* | 7/2008 | Nakaya et al. | 348/581 |
| 7,515,765 B1* | 4/2009 | MacDonald et al. | 382/263 |
| 7,916,214 B2* | 3/2011 | Kimura et al. | 348/558 |
| 8,098,329 B2* | 1/2012 | Suzuki et al. | 348/558 |

FOREIGN PATENT DOCUMENTS

| | | |
|---|---|---|
| JP | 2000-348189 | 12/2000 |
| JP | 2004-289753 | 10/2004 |
| JP | 2005-26814 | 1/2005 |
| JP | 2005-65195 | 3/2005 |
| JP | 2006-339934 | 12/2006 |

* cited by examiner

*Primary Examiner* — Matthew Bella
*Assistant Examiner* — Jose M Torres
(74) *Attorney, Agent, or Firm* — Finnegan Henderson Farabow Garrett & Dunner LLP

(57) ABSTRACT

There is provided an image determining device including a frequency band signal detecting unit for dividing an image into a plurality of local regions and detecting for each local region signals of a plurality of frequency bands from the image signal; an average value calculating unit for calculating an average value of a characteristic value corresponding to an amplitude, for each local region and for each signal of the plurality of frequency bands; a local region selecting unit for selecting at least one local region based on image information; an average value selecting unit for selecting the average value corresponding to the selected local region; a relative value calculating unit for calculating a relative value of one average value with respect to another average value both of the average values being of the selected average values; and an image determining unit for determining an image based on the relative value.

11 Claims, 14 Drawing Sheets

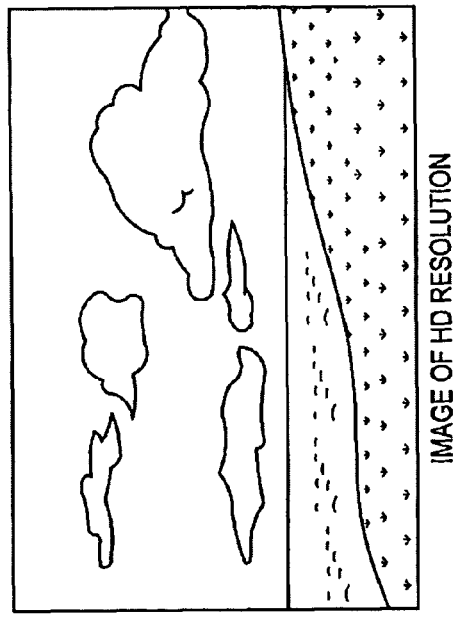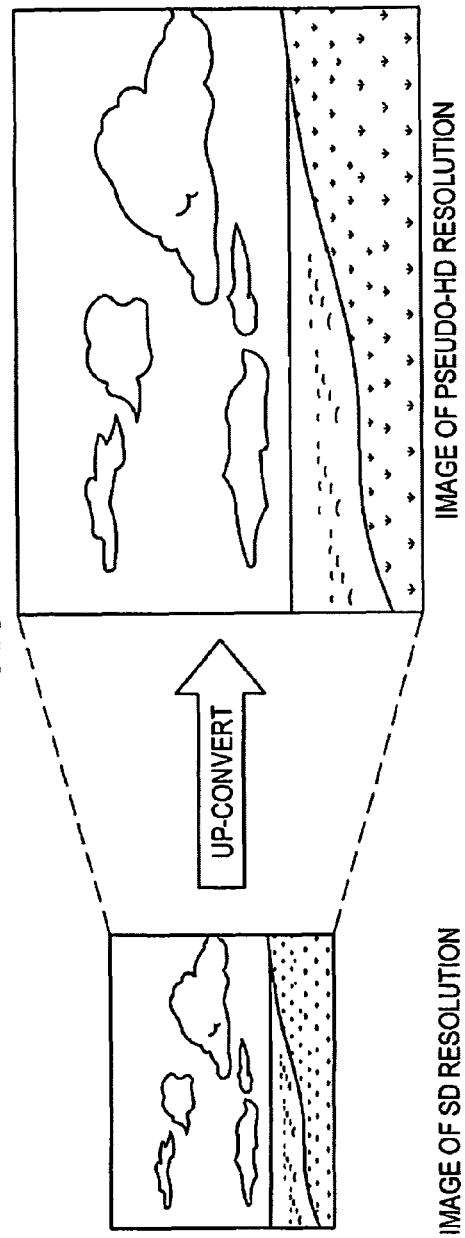

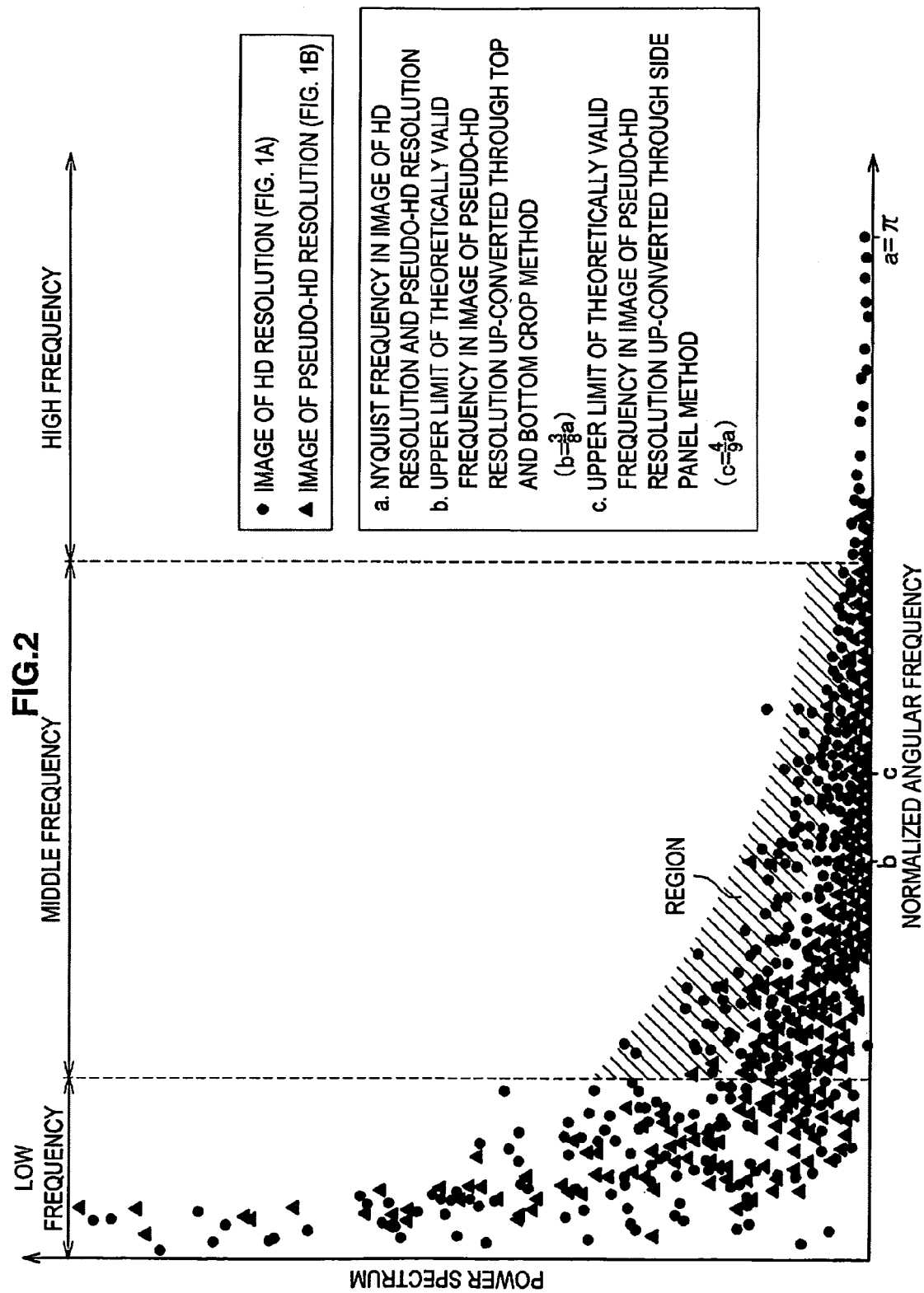

FIG.13

| SELECTION CRITERIA / LOCAL REGION | MAGNITUDE OF RELATIVE VALUE | DISTANCE FROM CENTER POINT OF IMAGE | DIFFERENCE WITH BRIGHTNESS REFERENCE VALUE | SELECTION CRITERION VALUE |
|---|---|---|---|---|
| LOCAL REGION 1 | 1 | 3 | 0 | 4 |
| LOCAL REGION 2 | 3 | 1 | 1 | 5 |
| LOCAL REGION 3 | 2 | 2 | 3 | 7 |
| LOCAL REGION 4 | 0 | 0 | 2 | 2 |
| LOCAL REGION 5 | — | — | — | — |

IMAGE DETERMINING DEVICE, IMAGE DETERMINING METHOD, AND PROGRAM

CROSS REFERENCES TO RELATED APPLICATIONS

The present invention contains subject matter related to Japanese Patent Application JP 2007-205801 filed in the Japan Patent Office on Aug. 7, 2007, the entire contents of which being incorporated herein by reference.

BACKGROUND OF THE INVENTION

1. Field of the Invention

The present invention relates to an image determining device, an image determining method, and a program.

2. Description of the Related Art

In recent years, image signals of HD (High definition) resolution are being transmitted from broadcast station etc. with the start of digital broadcast. However, the image signals transmitted from the broadcast station etc. are not all image signals of HD resolution, and sometimes contain image signals of pseudo-HD resolution in which the image signal of SD (Standard Definition) resolution used in the analog broadcast of the related art is up-converted to HD resolution.

A side panel method, a top and bottom crop method, a stretch method, and the like are known as a method of up-converting the image of SD resolution to the image of HD resolution.

Generally, the image of pseudo-HD resolution in which the image of SD resolution is up-converted to the image of HD resolution is inferior to the image of pure HD resolution in terms of image quality, and thus image correction such as enhancement of the outline of the image becomes necessary using an outline compensator (image enhancer), and the like.

A technique of determining whether or not the image signal is the image obtained by up-converting the image of SD resolution to the image of HD resolution is being developed.

A technique of determining the image by detecting a side panel includes Japanese Patent Application Laid-Open No. 2005-65195 etc. A technique of determining the image by calculating an average luminance in addition to detecting the side panel includes Japanese Patent Application Laid-Open No. 2005-26814 etc.

SUMMARY OF THE INVENTION

However, in the technique of determining the image by detecting the side panel, the signal of the side panel serving as an invalid region is desirably only the signal of lower than or equal to a predetermined threshold value. Therefore, the technique of determining the image by detecting the side panel can determine the image only when the signal of the side panel to be added to the image obtained by up-converting the image of the SD resolution to the image of the HD resolution is the signal of lower than or equal to the predetermined threshold value.

The method of up-converting the image of SD resolution to the image of HD resolution includes, not only the side panel method, but also a method of up-converting without including the side panel serving as the invalid region such as the top and bottom crop method and the stretch method. Therefore, the technique of determining the image by detecting the side panel described above may not make the determination of the image if the side panel is not contained in the image signal.

Since the technique of determining the image by calculating the average luminance in addition to detecting the side panel also assumes the detection of the side panel, the determination of the image also may not be made if the side panel is not contained in the image signal.

Therefore, the technique of the related art of determining whether or not the image indicated by the image signal is the image obtained by up-converting the image of SD resolution to the image of HD resolution (image determining technique of the related art) can make the determination of the image only exclusively under constant conditions.

In view of the above issues, it is desirable to provide a new and improved image determining device, an image determining method, and a program capable of determining the image regardless of which up-conversion method was used to up-convert the image.

According to an embodiment of the present invention, there is provided an image determining device including a frequency band signal detecting unit for dividing an image indicated by an image signal into a plurality of local regions and detecting for each local region signals of a plurality of frequency bands from the image signal; an average value calculating unit for calculating an average value of a characteristic value corresponding to an amplitude, for each local region and for each signal of the plurality of frequency bands detected by the frequency band signal detecting unit; a local region selecting unit for selecting at least one local region based on image information of one or more image signals; an average value selecting unit for selecting the average value corresponding to the local region selected in the local region selecting unit; a relative value calculating unit for calculating a relative value of one average value with respect to another average value, both of the average values being of the average values for each of the plurality of frequency bands selected in the average value selecting unit; and an image determining unit for determining an image based on the relative value calculated by the relative value calculating unit.

The image determining device includes a frequency band signal detecting unit, an average value calculating unit, a local region selecting unit, an average value selecting unit, a relative value calculating unit, and an image determining unit. The frequency band signal detecting unit can detect signals of a plurality of frequency bands from the image signal for each local region by filtering the image signal for each pixel. The average value calculating unit can calculate an average value of a characteristic value corresponding to an amplitude in each local region for each signal of the plurality of frequency bands. The local region selecting unit can select at least one local region based on one or more image information. The image information may be information related to the image indicated by the image signal based on the input image signal (e.g., reliability set from the image signal, the average value, the Euclidean distance to be hereinafter described, the relative value to be hereinafter described, number of samples of the characteristic value, a brightness value to be hereinafter described, etc.). The average value selecting unit can select the average value corresponding to the local region selected in the local region selecting unit from the average values calculated by the average value calculating unit. The relative value calculating unit can calculate a relative value of another average value with respect to one average value of the average values for each of the plurality of frequency bands selected in the average value selecting unit. The lower limit of the frequency in the frequency band from which the one average value is derived can be set lower than a lower limit of the frequency in the frequency band from which the other average value is derived. The image determining unit can perform determination of the image based on the relative value calculated by the relative value calculating unit. According to such configuration, the determination of the image can be performed regardless of with which up-conversion method the image was up-converted.

A number-of-samples reliability setting unit for setting a first reliability with respect to the number of samples of the characteristic value, for each local region and for each signal of the plurality of frequency bands detected by the frequency band signal detecting unit; an average value reliability setting unit for setting a second reliability with respect to the average value for each local region calculated by the average value calculating unit; and a local region reliability setting unit for setting a third reliability with respect to the local region for each local region based on the first reliability and the second reliability may be further arranged, and the local region selecting unit may select at least one local region based further on the third reliability.

According to the relevant configuration, determination of the image can be performed after excluding the factors which lower the reliability of the determination result of the image.

The local region selecting unit may select, based on an Euclidean distance from a predetermined reference position, at least one local region from the local regions in which the third reliability indicates a value greater than or equal to a predetermined threshold value.

According to the relevant configuration, determination can be performed using an image signal component of a region in which the possibility the important information exists is high.

The image information may be the average value of each of the plurality of frequency bands in each local region calculated by the average value calculating unit; and the local region selecting unit may calculate for each local region the relative value corresponding to the image information, and select at least one local region based on the relative value for each local region.

According to the relevant configuration, determination can be performed using an image signal component of a region in which the possibility the important information exists is high.

The image information may be one average value calculated by the average value calculating unit for the plurality of frequency bands and for each local region; and the local region selecting unit may select at least one local region based on a magnitude of the one average value for each local region.

According to the relevant configuration, determination can be performed using an image signal component of a region in which the possibility the important information exists is high.

The image information may be the number of samples of the characteristic value for the plurality of frequency bands and for each local region; and the local region selecting unit may select at least one local region based on the number of samples for each local region.

According to the relevant configuration, determination can be performed using an image signal component of a region in which the possibility the important information exists is high.

A brightness value setting unit for setting a brightness value based on luminance information from the image signal for each local region may be further arranged; wherein the local region selecting unit may select at least one local region based on the brightness value for each local region.

According to the relevant configuration, determination can be performed using an image signal component of a region in which the possibility the important information exists is high.

The relative value calculating unit may calculate the relative value based on the average value calculated for a predetermined frequency band and the average value calculated for a higher frequency band than the predetermined frequency band.

According to such configuration, determination of the image can be performed regardless of with which up-conversion method the image was up-converted.

A lower limit frequency of the predetermined frequency may be lower than a theoretically effective upper limit frequency, according to an up-conversion method, corresponding to a Nyquist frequency of an image up-converted from an image of standard definition; and a lower limit frequency of the higher frequency band may be higher than a theoretically effective upper limit frequency, according to the up-conversion method, corresponding to the Nyquist frequency of the image up-converted from the image of standard definition.

According to such configuration, determination of the image can be performed regardless of with which up-conversion method the image was up-converted.

According to the embodiments of the present invention described above, there is provided an image determining method including the steps of dividing an image indicated by an image signal into a plurality of local regions, and detecting for each local region signals of a plurality of frequency bands from the image signal; calculating an average value of a characteristic value corresponding to an amplitude, for each local region and for each signal of the plurality of frequency bands detected in the detecting step; selecting at least one local region based on image information of one or more image signals; selecting the average value corresponding to the local region selected in the step of selecting the local region; calculating a relative value of one average value with respect to another average value, both of the average values being of the average values for each of the plurality of frequency bands selected in the step of selecting the average value; and determining an image based on the relative value calculated in the step of calculating the relative value.

According to such method, determination of the image can be performed regardless of with which up-conversion method the image was up-converted.

According to the embodiments of the present invention described above, there is provided a program for causing a computer to execute the steps of dividing an image indicated by an image signal into a plurality of local regions, and detecting for each local region signals of a plurality of frequency bands from the image signal; calculating an average value of a characteristic value corresponding to an amplitude, for each local region and for each signal of the plurality of frequency bands detected in the detecting step; selecting at least one local region based on image information of one or more image signals; selecting the average value corresponding to the local region selected in the step of selecting the local region; calculating a relative value of one average value with respect to another average value, both of the average values being of the average values for each of the plurality of frequency bands selected in the step of selecting the average value; and determining an image based on the relative value calculated in the step of calculating the relative value.

According to such program, determination of the image can be performed regardless of with which up-conversion method the image was up-converted.

According to the embodiments of the present invention described above, determination of the image can be performed regardless of with which up-conversion method the image was up-converted according to the embodiments of the present invention.

BRIEF DESCRIPTION OF THE DRAWINGS

FIG. 1A is an explanatory view describing an image of HD resolution, and an image up-converted from an image of SD conversion;

FIG. 1B is an explanatory view describing the image of HD resolution, and the image up-converted from the image of SD resolution;

FIG. 2 is an explanatory view describing a difference in frequency amplitude characteristic between the image of HD resolution shown in FIG. 1A and the image of pseudo-HD resolution shown in FIG. 1B;

FIG. 13 is an explanatory view describing one example of a local region selecting method in the image determining device according to the sixth embodiment of the present invention.

DETAILED DESCRIPTION OF THE PREFERRED EMBODIMENTS

Figure 3:
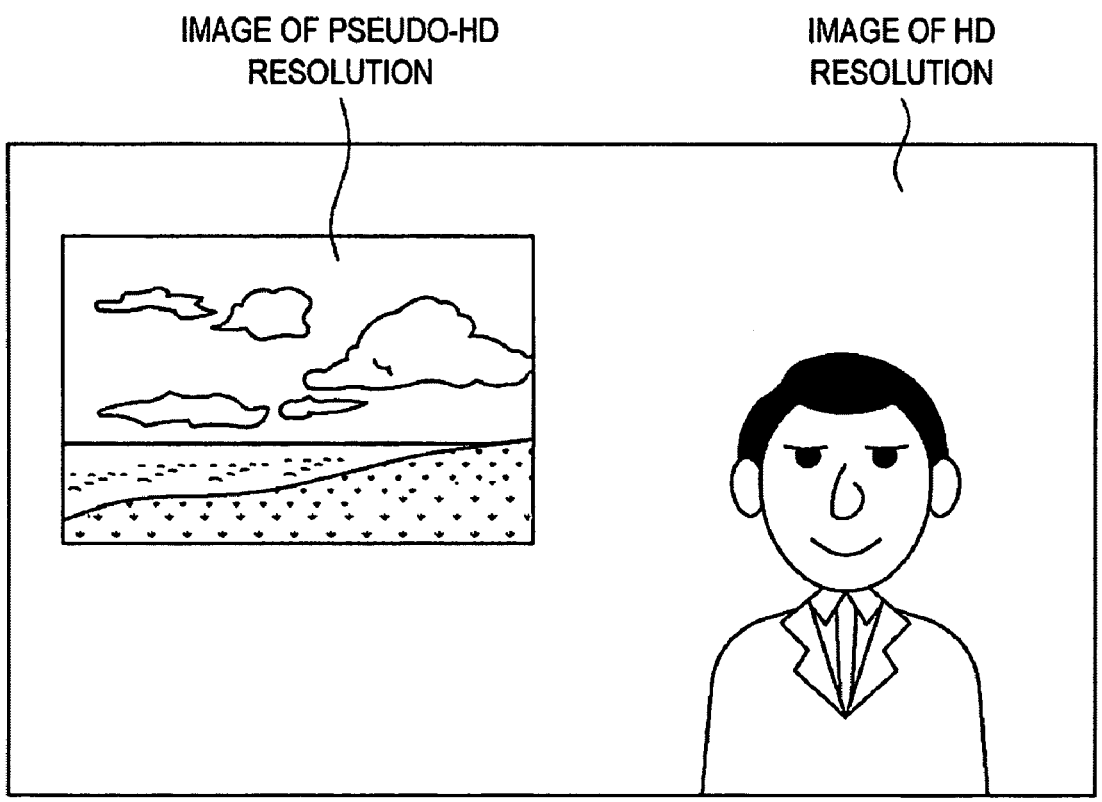
FIG. 3 is an explanatory view showing one example of a determining target according to an embodiment of the present invention.

Hereafter, preferred embodiments of the present invention will be described in detail with reference to the appended drawings. Note that in this specification and the appended drawings, structural elements that have substantially the same functions and structures are denoted with the same reference numerals and a repeated explanation of these structural elements is omitted.

(Principle of Image Determination)

First, the principle of image determination in the present invention will be described.

FIGS. 1A and 1B are explanatory views describing an image of HD resolution and an image up-converted from an image of SD resolution. FIG. 1A shows the image of HD resolution. FIG. 1B shows the image of SD resolution and the image up-converted from the image of SD resolution (hereinafter, referred to as "image of pseudo-HD resolution").

As shown in FIG. 1B, the image of the pseudo-HD resolution is not necessarily added with a side panel serving as an invalid region. Therefore, the image of pseudo-HD resolution that does not include the side panel as in FIG. 1B may not be determined in the image determining technique of the related art. In an embodiment according to the present invention, the difference in frequency amplitude characteristic between the image of HD resolution and the image of pseudo-HD resolution is used to discriminate the image of HD resolution and the image of pseudo-HD resolution.

FIG. 2 is an explanatory view describing the difference in frequency amplitude characteristic between the image of HD resolution shown in FIG. 1A and the image of pseudo-HD resolution shown in FIG. 1B. FIG. 2 shows a relationship between frequency and amplitude in the image, where the horizontal axis indicates normalized angular frequency, and the vertical axis indicates power spectrum of the amplitude.

It is apparent with reference to FIG. 2 that the image of HD resolution shown in FIG. 1A and the image of pseudo-HD resolution shown in FIG. 1B have a signal of large amplitude in the band of low frequency in FIG. 2 (hereinafter, referred to as "low-range frequency band"), and the amplitude of the signal attenuates the higher the frequency becomes. The frequency amplitude characteristic in which the amplitude is large in the low-range frequency band and the amplitude attenuates as the frequency becomes higher as shown in FIG. 2 is met in a general image such as natural image.

Comparing the signal of the image of HD resolution and the signal of the image of pseudo-HD resolution based on FIG. 2, it is found that the signals are similarly distributed in the low-range frequency band, but the attenuation rate of the amplitude differs. That is, in the band in which the frequency is higher than the low-range frequency band in FIG. 2 (hereinafter, referred to as "mid-range frequency band"), the signals existing in region A of FIG. 2 are mainly signals of the image of HD resolution, and the signals of the image of pseudo-HD resolution exist only in an extremely small amount. Therefore, the attenuation rate of the amplitude becomes larger in the image of the pseudo-HD resolution than in the image of HD resolution.

In the region in which the frequency is higher than the mid-range frequency band in FIG. 2 (hereinafter, referred to as "high-range frequency band"), a difference in that the signals of the image of pseudo-HD resolution are barely distributed and the signals of the image of HD resolution are distributed is recognized. The frequency amplitude characteristic shown in FIG. 2 described above is not limited to the images of FIGS. 1A and 1B, and substantially all images show similar tendency.

Therefore, the embodiment according to the present invention focuses on the difference in the attenuation rate of amplitude between the image of the HD resolution and the image of pseudo-HD resolution, and uses an index (hereinafter, referred to as "HD degree") expressed in Equation 1 for the determination of the image.

HD degree=(average value of|characteristic value corresponding to amplitude of frequency band 2|/average value of|characteristic value corresponding to amplitude of frequency band 1|) (Equation 1)

The lower limit frequency of the frequency band 1 in Equation 1 is set to a frequency lower than the lower limit frequency of the frequency band 2. Therefore, the HD degree takes a value of 0 ⌋·HD degree<1 according to the frequency amplitude characteristic shown in FIG. 2. The HD degree becomes 0 (zero) when the characteristic value corresponding to amplitude (hereinafter, referred to as "amplitude characteristic value") does not exist in the frequency band 2.

The amplitude characteristic value may be the amplitude itself, or may be the power spectrum of the amplitude. It should be noted that the amplitude characteristic value is not limited to the above. The average value expressed in Equation 1 may be obtained with arithmetic average, but it is not limited to such calculation method, and may be a geometric average, or a weighted average with a predetermined weighting.

In Equation 1, the HD degree is calculated based on the average value of "absolute value of amplitude characteristic value" to more accurately obtain the HD degree, but it is not limited to such calculation method, and it should be recognized that the HD degree can be calculated based on "amplitude characteristic value before absolute value calculation".

The HD degree can express the difference in attenuation rate between the image of HD resolution and the image of pseudo-HD resolution shown in FIG. 2 since it is the relative value of the average value of the amplitude characteristic value in the frequency band 1 and the average value of the amplitude characteristic value in the frequency band 2. Therefore, the probability the image to be determined is the image of pseudo-HD resolution becomes very high as the HD degree of the image to be determined takes a value closer to 0 (zero), and the image to be determined is assumed as the image of HD resolution as the HD degree of the image to be determined takes a value closer to one.

(Other Examples of Determining Target According to the Embodiment of the Present Invention, and Summary of Determining Process)

The embodiment according to the present invention determines whether the image indicated by the image signal is the image of HD resolution or the image of pseudo-HD resolution by using the principle of image determination described above. However, the image indicated by the image signal transmitted from the broadcast station etc. is not limited to an image of single resolution, and the image of HD resolution and the image of pseudo-HD resolution sometimes coexist.

[Other Examples of Determining Target According to the Embodiment of the Present Invention]

FIG. 3 is an explanatory view showing one example of a determining target according to an embodiment of the present invention. As shown in FIG. 3, the image of HD resolution and the image of pseudo-HD resolution sometimes coexist in a news program, and the like. In the case of the image of FIG. 3, an accurate determination result may not be obtained (i.e., erroneous determination may occur) even if determination is made using the principle of image determination described above on the entire image.

[Outline of Determining Process]

Figure 4:
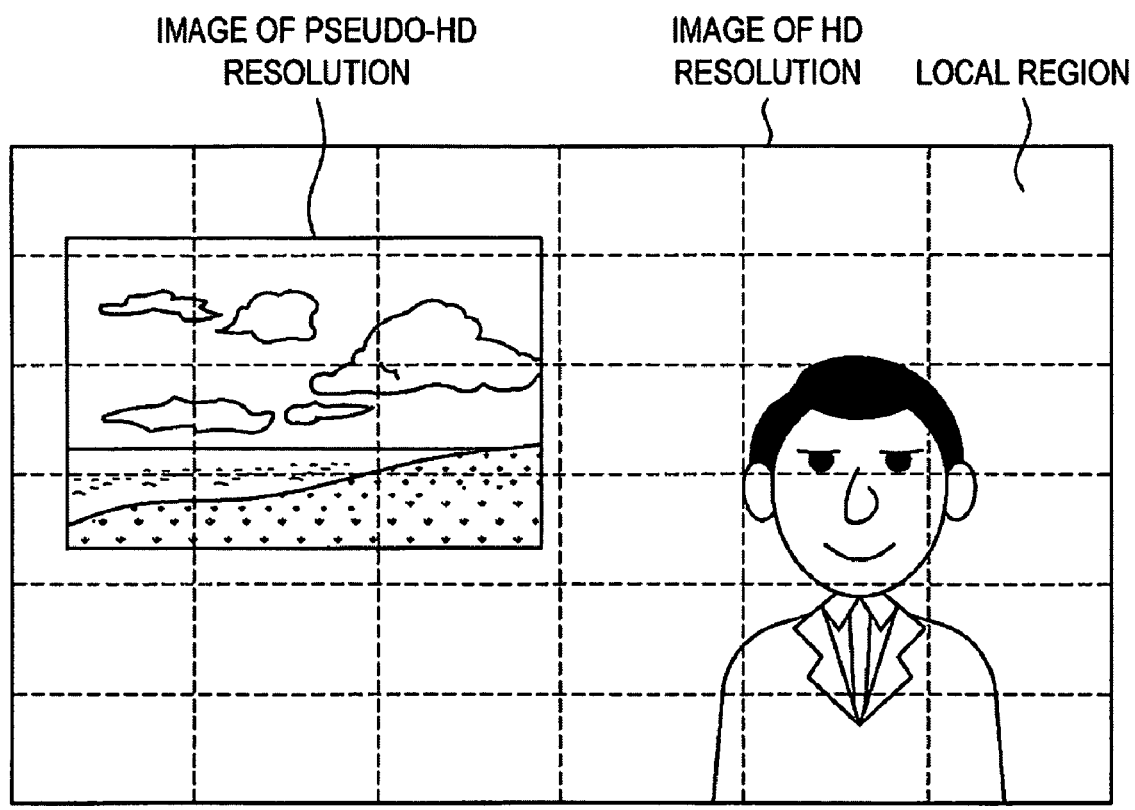
FIG. 4 is an explanatory view describing an outline of a determining process according to the embodiment of the present invention.

The outline of the process in the image determining device according to the embodiment of the present invention capable of making image determination even with respect to the image in which the image of HD resolution and the image of pseudo-HD resolution coexist as shown in FIG. 3 will be described. FIG. 4 is an explanatory view describing the outline of the determining process according to the embodiment of the present invention. The image determining device according to the embodiment of the present invention performs image determination according to the processes described in (1) to (3) below.

(1) Divide Image Into a Plurality of Regions

As shown in FIG. 4, the image determining device according to the embodiment of the present invention divides the entire image into a plurality of regions (hereinafter, referred to as "local region") to prevent erroneous determination that occurs by performing the determination using the principle of image determination described above on the entire image. In FIG. 4, a case where the image is divided into a lattice form so that the local region is of equal area has been described, but the local region according to the embodiment of the present invention is not limited to the example shown in FIG. 4. The local region according to the embodiment of the present invention may be divided into a lattice form of different areas, or into a non-lattice form with each local region having different shapes and areas.

(2) Select Region to Determine

The image determining device according to the embodiment of the present invention selects at least one local region of the plurality of local regions as a region for performing image determination. The image determining device according to the embodiment of the present invention can select a region in which the possibility the important information in the image exists is high by using at least one image information or information derived from the image signal. The important information in the image includes information indicating those having a high possibility of being noticed by the user watching the image such as characters and objects. A unit for selecting the local region according to the embodiment of the present invention will be hereinafter described.

(3) Determine Image

The image determining device according to the embodiment of the present invention performs determination of the image on the selected at least one local region. The image determining device according to the embodiment of the present invention can determine the image based on the determination result in the selected local region. If one local region is selected, the image determining device assumes the determination result in the selected local region as the determination result of the image indicated by the image signal. If a plurality of local regions is selected, the image determining device assumes the determination result of greatest number of the determination results in each selected local region as the determination result of the image indicated by the image signal.

By having the selected local region as a basis of image determination, the image determining device according to the embodiment of the present invention can alleviate the process related to image determination, and reduce the resources related to image determination compared to when performing image determination on all the local regions. Furthermore, by having the selected local region as a basis of image determination, the image determining device according to the embodiment of the present invention can perform image determination suited for a region in which the possibility more important information exists is high. It should be noted that the image determining device according to the embodiment of the present invention may obviously perform image determination with respect to each local region.

The image determining device according to the embodiment of the present invention can determine the image regardless of with which up-conversion method the image was up-converted by performing the processes described in (1) to (3) above.

The image determining device according to the embodiment of the present invention using the principle of image determination will be described in more detail below. In the following description, the image signal is assumed to be input to the image determining device according to the embodiment of the present invention, but the image signal to be input to the image determining device may indicate a stationary image or a moving image (so-called video).

The image signal to be input to the image determining device according to the embodiment of the present invention may be a digital signal used in digital broadcast and the like, or is not limited to the above, and may be an analog signal used in analog broadcast and the like. The image signal to be input to the image determining device according to the embodiment of the present invention may be transmitted from the broadcast station and received by the image determining device, but is not limited thereto. For instance, the image signal to be input to the image determining device according to the embodiment of the present invention may be transmitted from an external device via a network such as LAN (Local Area Network) and received by the image determining device, or may be readout by the image determining device from a video file or an image file held in a storage unit arranged in the image determining device.

(First Embodiment)

Figure 5:
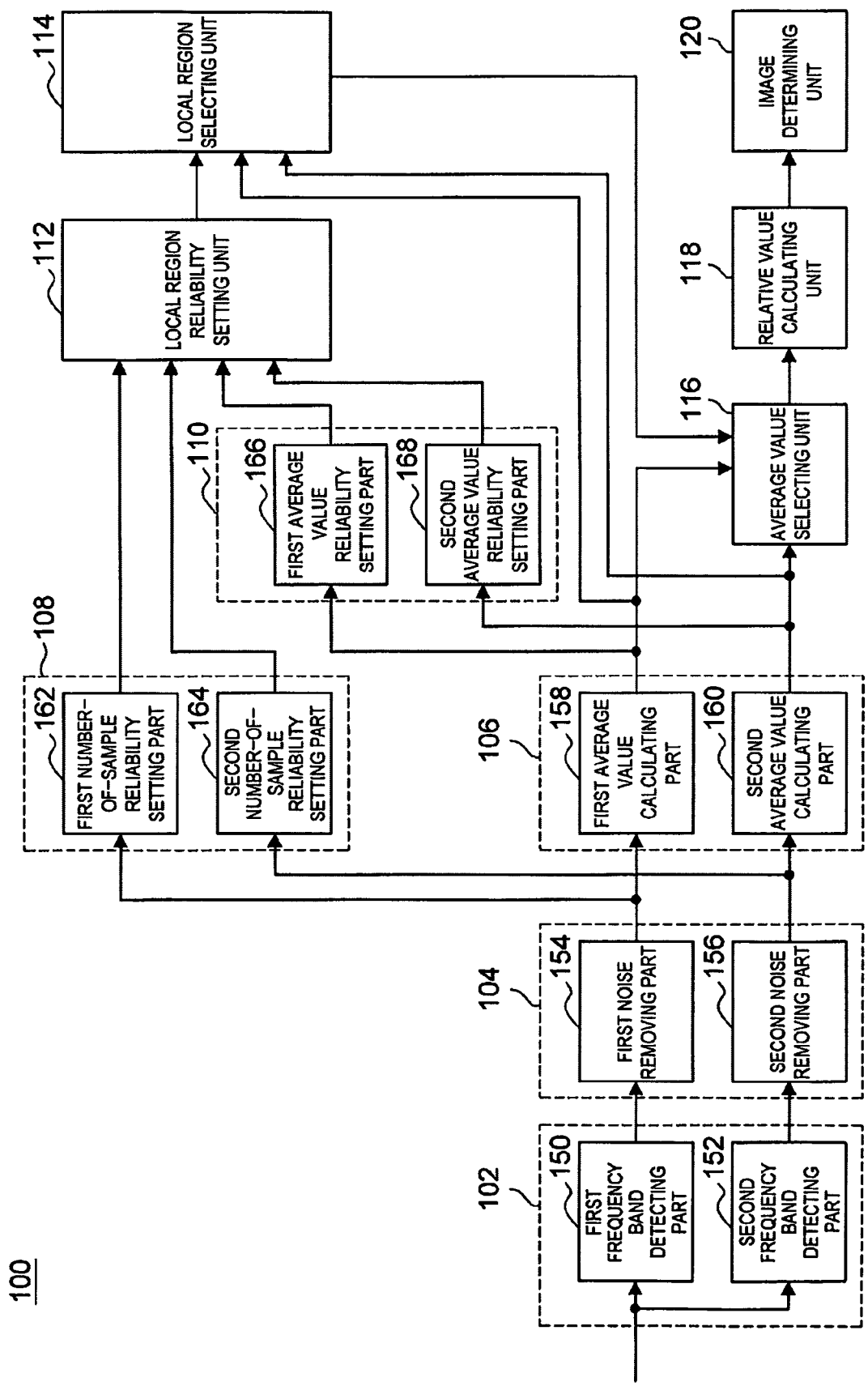
FIG. 5 is a block diagram showing an image determining device according to a first embodiment of the present invention.

FIG. 5 is a block diagram showing the image determining device 100 according to a first embodiment of the present invention.

With reference to FIG. 5, the image determining device 100 according to the first embodiment includes a frequency band signal detecting unit 102, a noise removing unit 104, an average value calculating unit 106, a number-of-samples reliability setting unit 108, an average value reliability setting unit 110, a local region reliability setting unit 112, a local region selecting unit 114, an average value selecting unit 116, a relative value calculating unit 118, and an image determining unit 120.

The image determining device 100 may include a control unit (not shown) configured by an MPU (Micro Processing Unit) and the like capable of controlling the entire image determining device 100; a ROM (Read Only Memory, not shown) recorded with program to be used by the control unit, control data of calculation parameter, and the like; a RAM (Random Access Memory, not shown) for primary storing program etc. to be executed by the control unit; a storage unit (not shown) capable of storing image etc. to be performed with determination by the image determining device 100; a receiving unit (not shown) for receiving an image signal transmitted from the broadcast station etc.; an operation unit (not shown) capable of being operated by a user; and the like. The image determining device 100 may have each component connected by a bus serving as a transmission path of data. The storage unit (not shown) includes a magnetic recording medium such as hard disk, a non-volatile memory such as flash memory, a magneto-optical disk, and the like, but is not limited thereto. The operation unit (not shown) includes an operation input device such as keyboard and mouse, a button, a direction key, or a combination of thereof, but is not limited thereto.

The frequency band signal detecting unit 102 includes a first frequency band detecting part 150 and a second frequency band detecting part 152, and performs filtering of an input image signal for each local region. The first frequency band detecting part 150 and the second frequency band detecting part 152 may be configured by a band pass filter (hereinafter, referred to as "BPF") of performing processes for each pixel, passing only the image signal of a specific frequency band, and attenuating the image signal of other bands.

Each local region in which the frequency band signal detecting unit 102 performs filtering can be set in advance, but is not limited thereto. For instance, each local region in which the frequency band signal detecting unit 102 performs filtering may be appropriately set according to the user input from the user using the image determining device 100.

The first frequency band detecting part 150 is configured by a low-range BPF which passes the frequency band of lower range than the upper limit of the theoretically effective frequency with respect to the Nyquist frequency in the image up-converted from the image of SD resolution, and which does not pass the DC (Direct Current) component.

The second frequency band detecting part 152 is configured by a mid-range BPF which passes the vicinity of the upper limit of the theoretically effective frequency with respect to the Nyquist frequency in the image up-converted from the image of SD resolution.

The low-range BPF configuring the first frequency band detecting part 150 and the mid-range BPF configuring the second frequency band detecting part 152 may be the frequency band partially overlapping. The upper limit of the theoretically effective frequency with respect to the Nyquist frequency in the image up-converted from the image of SD resolution differs depending on the up-conversion method. That is, as shown in FIG. 2, if the normalized Nyquist frequency in the HD resolution and the pseudo-HD resolution is $a(a=p \cdot$, the upper limit b of the theoretically effective frequency with respect to the Nyquist frequency of the image up-converted with the top and bottom crop method and the stretch method is $b=(3/8) \times a$, and the upper limit c of the theoretically effective frequency with respect to the Nyquist frequency of the image up-converted with the side panel method is $c=(4/9) \times a$.

Therefore, the first frequency band detecting part 150 and the second frequency band detecting part 152 have the first frequency band detecting part 150 set with the upper limit b of the theoretically effective frequency with respect to the Nyquist frequency as a reference, and the second frequency band detecting part 152 set with the upper limit c of the theoretically effective frequency with respect to the Nyquist frequency as a reference. The first frequency band detecting part 150 and the second frequency band detecting part 152 are not limited to the above, and both the first frequency band detecting part 150 and the second frequency band detecting part 152 may be set with the upper limit b of the theoretically effective frequency with respect to the Nyquist frequency as a reference.

The BPF configuring the first frequency band detecting part 150 and the second frequency band detecting part 152 have the side lobe reduced to enhance the detecting ability. Therefore, the BPF according to the first embodiment configures the BPF with the filter coefficient value set using a function in which Hamming window function is multiplied to the Sinc function, and the number of taps set to correspond to the filter coefficient value.

According to such configuration, in the BPF according to the first embodiment, the side lobe can be reduced and the main lobe can be brought close to a square wave than when using a discrete Fourier transformation. The window function used to set the filter coefficient value is not limited to the Hamming window configuration, and it should be recognized that Hanning window function, Gaussian window function, and the like can be used. The BPF according to the first embodiment is not limited to the above configuration, and may be configured by a digital filter.

The first frequency band detecting part 150 and the second frequency band detecting part 152 are not limited to the BPF, and may be configured by a high pass filter which passes only the image signal of a frequency of greater than or equal to a cutoff frequency and attenuates the image signal of a frequency smaller than the cutoff frequency. The first frequency band detecting part 150 and the second frequency detecting part 152 may be configured by a low pass filter which passes only the image signal of a frequency of lower than or equal to the cutoff frequency and attenuates the image signal of a frequency greater than the cutoff frequency. If the low pass filter is used, it is influenced by an average luminance corresponding to the signal in which the frequency is 0 (zero), and determination between the image of HD resolution and the image of pseudo-HD resolution may not be accurately performed depending on the average luminance.

Therefore, the frequency band signal detecting unit 102 is preferably configured by a filter which does not pass the image signal in which the frequency is 0 (zero), and it is not limited to BPF, and may be configured by an arbitrary filter.

The noise removing unit 104 includes a first noise removing part 154 and a second noise removing part 156, and removes noise of the image signal output from the frequency band signal detecting unit 102 for each local region. The first noise removing part 154 removes the noise of the image signal filtered for each pixel by the first frequency band detecting part 150, and outputs an amplitude characteristic value for each pixel in each local region. The second noise removing part 156 removes the noise of the image signal filtered for each pixel by the second frequency band detecting part 152, and outputs an amplitude characteristic value for each pixel in each local region.

The removal of noise in the noise removing unit 104 is performed by a predetermined threshold value of the amplitude characteristic value assumed as noise for each frequency band passed through the frequency band signal detecting unit 102. The removal of noise in the noise removing unit 104 may also be performed based on the measurement result of the noise measured by a noise measuring unit, where the noise measuring unit (not shown) for detecting noise for each frequency band passed through the frequency band signal detecting unit 102 is arranged in the image determining device 100. It should be noted that the noise removing part in the noise removing unit 104 is not limited to the above.

The average value calculating unit 106 includes a first average value calculating part 158 and a second average value calculating part 160, and calculates an average value of the amplitude characteristic values output from the noise removing unit 104 for each local region. The first average value calculating part 158 is input with the amplitude characteristic value for each pixel removed with noise by the first noise removing part 154, and the first average value calculating part 158 calculates the average value of the absolute value of the amplitude characteristic value for each local region. The second average value calculating part 160 is input with the amplitude characteristic value for each pixel removed with noise by the second noise removing part 156, and the second average value calculating part 160 calculates the average value of the absolute value of the amplitude characteristic value for each local region.

The average value in the first average value calculating part 158 and the second average value calculating part 160 can be obtained through arithmetic average. The method of calculating the average value in the average value calculating unit 106 is not limited to arithmetic average, and various methods may be used for calculation such as geometric average and weighted average.

The number-of-samples reliability setting unit 108 sets a first reliability based on the number of pixels (number of samples) which amplitude characteristic value is non-zero for each local region. The reason the image determining device 100 sets the first reliability includes the following reasons.

[Reason for Setting First Reliability]
The image determining device 100 performs determination of the image using the HD degree expressed in Equation 1. The statistical reliability of the average value lowers the fewer the number of samples for calculating the average value expressed in Equation 1. Therefore, if the HD degree is calculated using an average value of low statistical reliability, the image determining device 100 may not be able to accurately determine whether the image indicated by the input image signal is the image of HD resolution or the image of pseudo-HD resolution.

Therefore, the image determining device 100 sets the reliability with respect to the number of samples for calculating the average value to reduce the possibility of erroneous determination. The number-of-samples reliability setting unit 108 will be specifically described below.

The number-of-samples reliability setting unit 108 includes a first number-of-samples reliability setting part 162 for setting the first reliability based on the image signal output from the first noise removing part 154 for each local region, and a second number-of-samples reliability setting part 164 for setting the first reliability based on the image signal output from the second noise removing part 156 for each local region.

The setting of the first reliability in each of the first number-of-samples reliability setting part 162 and the second number-of-samples reliability setting part 164 can be carried out according to the following procedures (I) and (II). The setting of the first reliability in the first number-of-samples reliability setting part 162 will be described below by way of example, but the second number-of-samples reliability setting part 164 can similarly set the first reliability.

[One Example of Procedure for Setting First Reliability]
(I) Calculation of Number of Samples
The first number-of-samples reliability setting part 162 determines whether or not the amplitude characteristic value is non-zero for each pixel with respect to each local region, and calculates the number of samples. As a method of calculating the number of samples, the value of the counter may be increased by one each time the amplitude characteristic value is determined as non-zero, but the method is not limited thereto.

(II) Setting of First Reliability
The first number-of-samples reliability setting part 162 sets the first reliability based on the calculated number of samples. The first number-of-samples reliability setting part 162 can set the first reliability by comparing the calculated number of samples with a predetermined threshold value. The first number-of-samples reliability setting part 162 sets the first reliability to "1" (i.e., number of samples is a value usable for calculating the average value expressed in Equation 1) when the calculated number of samples is greater than or equal to the predetermined threshold value, and sets the first reliability to "0" (i.e., number of samples is a value non-usable for calculating the average value expressed in Equation 1) when the calculated number of samples is smaller than the predetermined threshold value. The predetermined threshold value used for setting the first reliability may be a predefined fixed value, but is not limited thereto, and may be a value varied according to the user input. It should be noted that the method of setting the first reliability is not limited to the above. The first reliability set by the first number-of-samples reliability setting part 162 is not limited to the two values described above ("0" or "1").

The predetermined threshold value used by the first number-of-samples reliability setting part 162 to set the first reliability may be stored in the storage unit, which storage unit is arranged in the number-of-samples reliability setting unit 108 (or storage unit may be arranged in the first number-of-samples reliability setting part 162). The storage unit of the number-of-samples reliability setting unit 108 includes a non-volatile memory such as EEPROM (Electrically Erasable and Programmable Read Only Memory), flash memory, MRAM (Magnetoresistive Random Access Memory), FeRAM (Ferroelectric Random Access Memory), PRAM (Phase change Random Access Memory), and the like, but is not limited thereto. It should be recognized that the predetermined threshold value used to set the first reliability may be stored in a storage unit (not shown) of the image determining device 100, and appropriately read out from the storage unit (not shown) by the first number-of-samples reliability setting part 162.

The number-of-samples reliability setting unit 108 can set the first reliability for each local region according to the procedures (I) and (II) described above.

The average value reliability setting unit 110 sets a second reliability based on the average value calculated by the average value calculating unit 106 for each local region. The reason the image determining device 100 sets the second reliability includes the following reasons.

[Reason for Setting Second Reliability]

As described above, the image determining device 100 performs determination of the image using the HD degree expressed in Equation 1. If the average value expressed in Equation 1 is a very small value, influence of noise etc. (noise that could not be removed in the noise removing unit 104) becomes large, and thus the reliability of the average value may be lower. Therefore, if the HD degree is calculated using an average value of low reliability, the image determining device 100 may not be able to accurately determine whether the image indicated by the input image signal is the image of HD resolution or the image of pseudo-HD resolution.

Therefore, the image determining device 100 sets the reliability with respect to the calculated average value to reduce the possibility of erroneous determination. The average value reliability setting unit 110 will be specifically described below.

The average value reliability setting unit 110 includes a first average value reliability setting part 166 for setting the second reliability based on the average value output from the first average value calculating part 158 for each local region, and a second average value reliability setting part 168 for setting the second reliability based on the average value output from the second average value calculating part 160 for each local region.

The setting of the second reliability in each of the first average value reliability setting part 166 and the second average value reliability setting part 168 is carried out as described below. The setting of the second reliability in the first average value reliability setting part 166 will be described below by way of example, but the second average value reliability setting part 168 can similarly set the second reliability.

[One Example of Procedure for Setting Second Reliability]

The first average value reliability setting part 166 can set the second reliability by comparing the average value output from the first average value calculating part 158 and a predetermined threshold value. The first average reliability setting part 166 sets the second reliability to "1" (i.e., average value is a value usable for calculating the HD degree expressed in Equation 1) when the average value output from the first average value calculating part 158 is greater than or equal to the predetermined threshold value, and sets the second reliability to "0" (i.e., average value is a value non-usable for calculating the HD degree expressed in Equation 1) when the average value output from the first average value calculating part 158 is smaller than the predetermined threshold value. The predetermined threshold value used for setting the second reliability may be a predefined fixed value, but is not limited thereto, and may be a value varied according to the user input. It should be noted that the method of setting the second reliability is not limited to the above. The second reliability set by the first average value reliability setting part 166 is not limited to the two values described above ("0" or "1").

The predetermined threshold value used by the first average value reliability setting part 166 to set the second reliability may be stored in the storage unit, which storage unit is arranged in the average reliability setting unit 110 (or storage unit may be arranged in the first average value reliability setting part 166). The storage unit of the average value reliability setting unit 110 includes a non-volatile memory such as EEPROM, flash memory, and the like, but is not limited thereto. It should be recognized that the predetermined threshold value used to set the second reliability may be stored in a storage unit (not shown) of the image determining device 100, and appropriately read out from the storage unit (not shown) by the first average value reliability setting part 166.

The average value reliability setting unit 110 can set the second reliability for each local region according to the procedures described above.

The local region reliability setting unit 112 sets a third reliability, which is the reliability with respect to each local region, for each local region based on the first reliability output from the number-of-samples reliability setting unit 108 and the second reliability output from the average value reliability setting unit 110.

[One Example of Procedure for Setting Third Reliability]

The local region reliability setting unit 112 can set the third reliability for each local region based on the first reliability (first first reliability) for each local region set by the first number-of-samples reliability setting part 162, the first reliability (second first reliability) for each local region set by the second number-of-samples reliability setting part 164, the second reliability (first second reliability) for each local region set by the first average value reliability setting part 166, and the second reliability (second second reliability) for each local region set by the second average value reliability setting part 168.

The local region reliability setting unit 112 can set the third reliability through AND operation and the like. In other words, the local region reliability setting unit 112 can set the third reliability to "1" (i.e., image determination using the image signal of the relevant local region is possible) when the first first reliability, the second first reliability, the first second reliability, and the second second reliability are all "1" in a certain local region. The local region reliability setting unit 112 can set the third reliability to "0" (i.e., image determination using image signal of the relevant local region is not possible) when one of the first first reliability, the second first reliability, the first second reliability, and the second second reliability is "0" in a certain local region. It should be noted that the method of setting the third reliability is not limited to the above. The third reliability set by the local region reliability setting unit 112 is not limited to the two values ("0" or "1").

The local region reliability setting unit 112 can set the third reliability for each local region through the above procedures.

The local region selecting unit 114 can select one local region to use for image determination from each local region using the image information or the information derived from the image signal. Specifically, the local region selecting unit 114 selects a local region satisfying the following first condition using "reliability (third reliability) of local region" and "HD degree (relative value)" as the image information.

<First Condition>

Condition 1-1: Local region in which reliability (third reliability) of local region is high Condition 1-2: Local region at where largest HD degree (relative value) can be calculated The local region selecting unit 114 can select the local region that contains the most high resolution image signal by having the condition 1-2 as the selecting condition of the location region.

To determine the local region satisfying the first condition, the local region selecting unit 114 is input with the third reliability for each local region set by the local region reliability setting unit 112, the average value for each local region calculated by the first average value calculating part 158, and the average for each local region calculated by the second average value calculating part 160. One example of the method of selecting the local region in the image determining device 100 is shown below.

[First Local Region Selecting Method]

Figure 6:
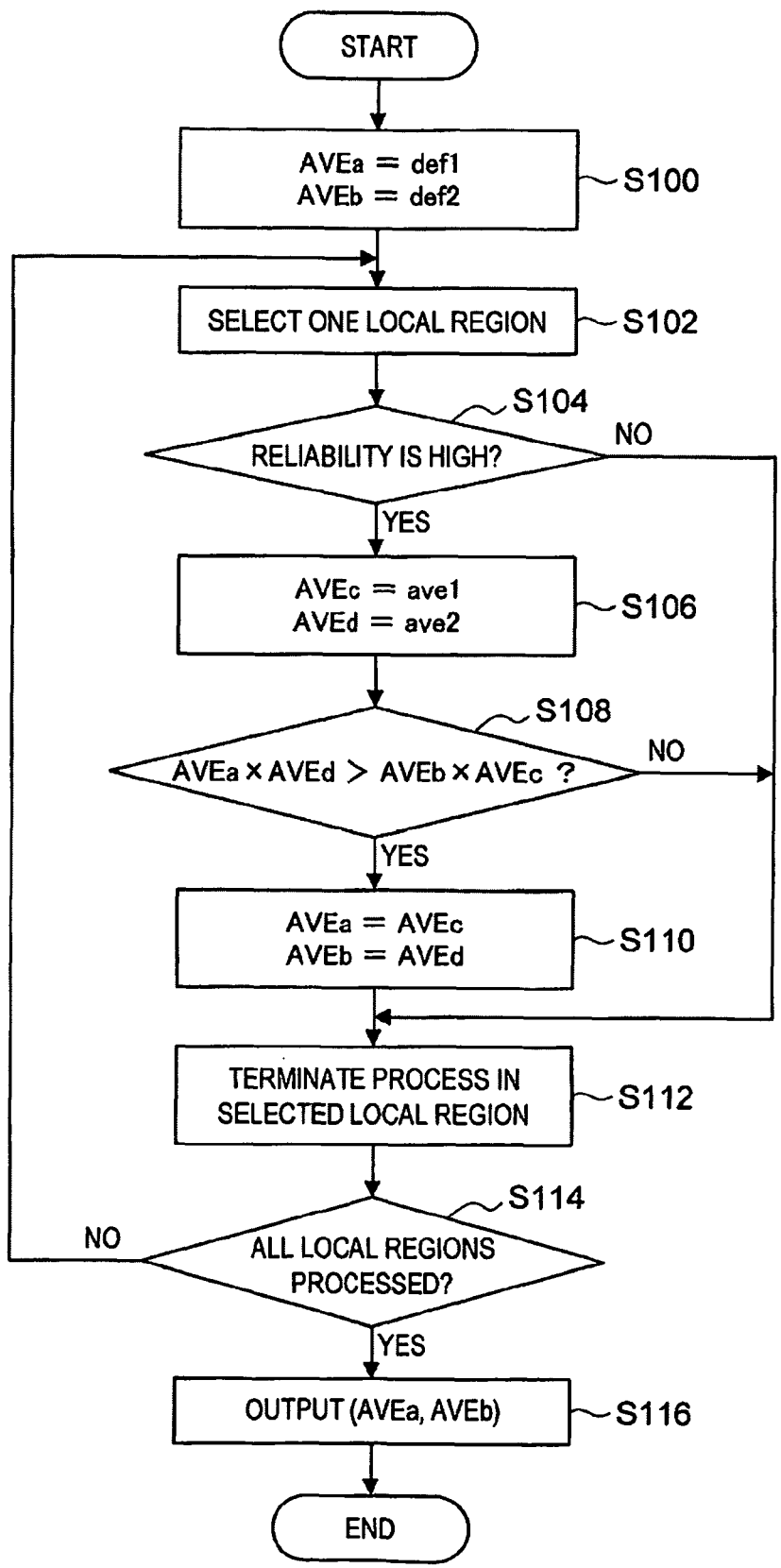
FIG. 6 is a flowchart showing one example of a first local region selecting method in the image determining device according to the first embodiment of the present invention.

FIG. 6 is a flowchart showing one example of the first local region selecting method in the image determining device 100 according to the first embodiment of the present invention. The local region selecting method shown in FIG. 6 can be performed by the local region selecting unit 114.

First, the local region selecting unit 114 sets an initial value as an average value for calculating the HD degree (relative value) (S100). In FIG. 6, an example where an initial value def1 is set for one average value AVEa for calculating the HD degree (relative value), and an initial value def2 is set for the other average value AVEb is shown. The initial values def1, def2 include values satisfying the following conditions.

<Example of Setting Condition of Initial Value> def1<0

$|def1|>|def2|$ def2>0

The initial values def1, def2 may be stored in the storage unit of the local region selecting unit 114. The storage unit arranged in the local region selecting unit 114 may be a non-volatile memory such as EEPROM, flash memory, and the like, but is not limited thereto. The initial values def1, def2 may be fixed predetermined values, or may be appropriately set according to user input.

The local region selecting unit 114 selects one local region (S102). In step S102, the local region selecting unit 114 may select the local region in a predefined order so as to sequentially select from the local region corresponding to the upper left of the image, or may select the local region at random.

The local region selecting unit 114 determines whether or not the reliability (third reliability) of the local region selected in step S102 is high (S104). If the reliability (third reliability) of the local region is represented with two values, the local region selecting unit 114 can determine that the reliability is high if the reliability (third reliability) of the local region indicates "1". If the reliability (third reliability) of the local region is represented other than with two values, the local region selecting unit 114 can determine that the reliability is high if the reliability (third reliability) of the local region is greater than or equal to a predetermined threshold value.

If determined that the reliability (third reliability) of the selected local region is high in step S104, the local region selecting unit 114 sets the average value calculated in the selected local region as an average value candidate for calculating the HD degree (relative value) (S106). In FIG. 6, an example where ave1 calculated by the first average value calculating part 158 in the selected local region is set as one average value candidate AVEc, and ave2 calculated by the second average value calculating part 160 in the selected local region is set as the other average value candidate AVEd is shown.

If determined that the reliability (third reliability) of the selected local region is not high in step S104, the local region selecting unit 114 terminates the process in the selected local region (S112).

After the average value candidates are set in step S106, the local region selecting unit 114 determines whether or not it is the local region at where greater HD degree (relative value) can be calculated (S108). The determination in step S108 is made from whether or not the conditional equation "(AVEax·AVEd)>(AVEbx·AVEc)" is satisfied as shown in FIG. 6. Through the determination of step S108, the local region selecting unit 114 can select the local region that satisfies the condition 1-2 (whether it is the local region at where the highest HD degree (relative value) can be calculated).

If determined that the first condition is satisfied in step S108, the local region selecting unit 114 updates the average value for calculating the HD degree (relative value) (S110). In FIG. 6, an example where one average value AVEa for calculating the HD degree (relative value) is updated to the average value candidate AVEc, and the other average value AVEb is updated to the average value candidate AVEd is shown. After the average value is updated in step S110, the local region selecting unit 114 terminates the process in the selected local region (S112).

If determined that the first condition is not satisfied in step S108, the local region selecting unit 114 terminates the process in the selected local region (S112).

After the process in the selected local region is terminated in step S112, the local region selecting unit 114 determines whether or not all the local regions are processed (S114). The local region selecting unit 114 may increase the value of the counter each step S112 is performed, and determine that all the local regions are processed when the value of the counter reaches the number of local regions, but it is not limited thereto.

If not determined that all the local regions are processed in step S114, the local region selecting unit 114 repeats the processes from step S102.

If determined that all the local regions are processed in step S114, a set of average values (AVEa, AVEb) for calculating the HD degree (relative value) are output (S116).

Therefore, through the processes of steps S100 to S116 shown in FIG. 6, the image determining device 100 can determine whether or not the first condition (condition 1-1 and condition 1-2) is satisfied for each local region, and output the set of average values (AVEa, AVEb) for calculating the HD degree (relative value).

In the first local region selecting method shown in FIG. 6, the initial values (def1, def2) can be output as the set of average values if the reliability (third reliability) of all the local regions is low. Therefore, the image determining device 100 using the first local region selecting method can also select "not select local region for performing image determination". If the local region is not selected, the image determining device 100 may choose to "not perform image determination", but is not limited thereto, and may choose to "output predetermined determination result".

[Second Local Region Selecting Method]

As described above, the image determining device 100 can select one local region satisfying the first condition by suing the first local region selecting method shown in FIG. 6. The local region selecting method in the image determining device 100 according to the first embodiment of the present invention, however, is not limited to the method shown in FIG. 6. A second local region selecting method, which is another local region selecting method in the image determining device 100, will be described below.

Figure 7:
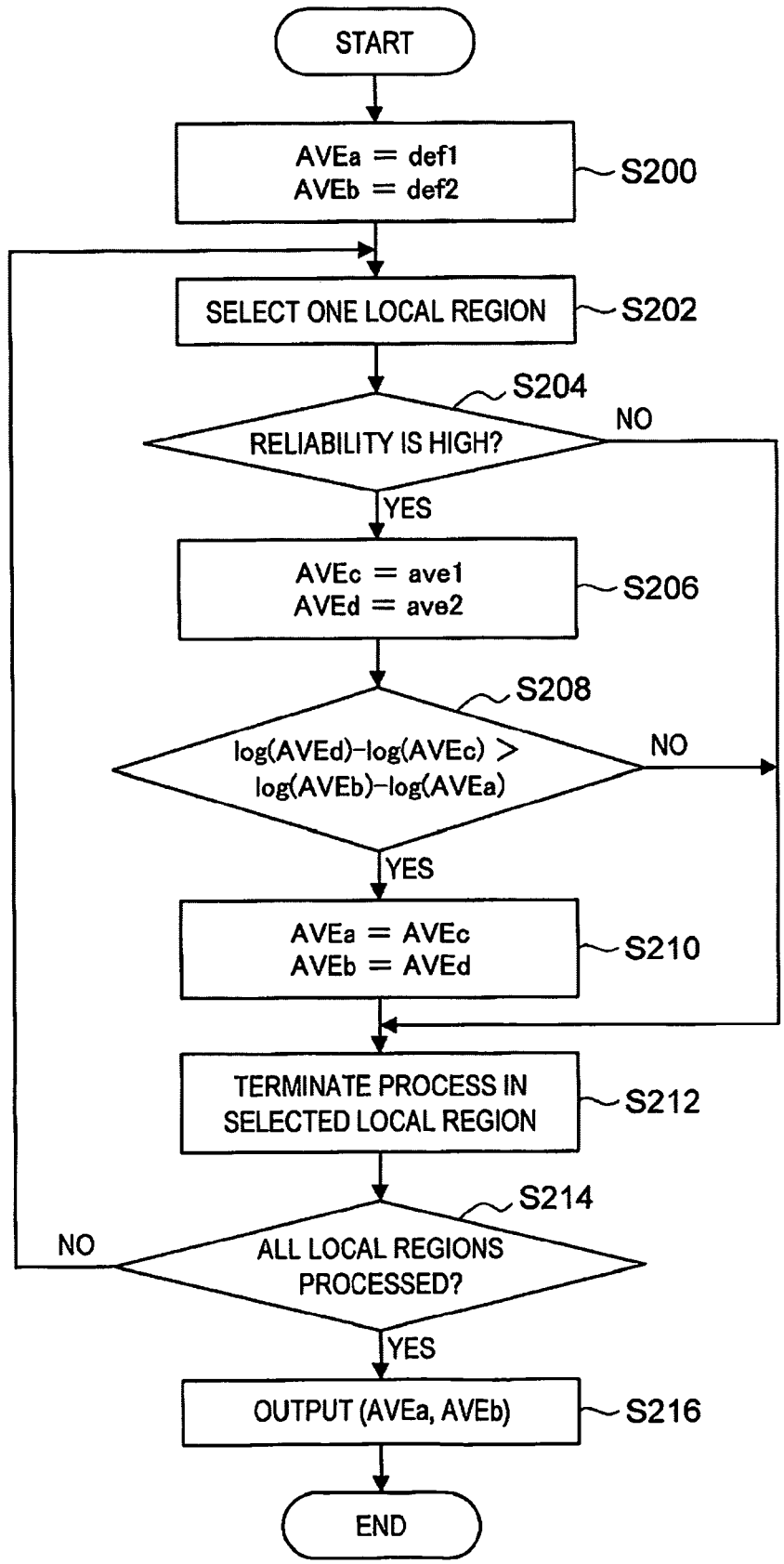
FIG. 7 is a flowchart showing one example of a second local region selecting method in the image determining device according to the first embodiment of the present invention.

FIG. 7 is a flowchart showing one example of the second local region selecting method in the image determining device 100 according to the first embodiment of the present invention. The local region selecting method shown in FIG. 7 can be performed by the local region selecting unit 114.

First, the local region selecting unit 114 sets an initial value as an average value for calculating the HD degree (relative value) (S200), similar to the first local region selecting method shown in FIG. 6. In FIG. 7, an example where an initial value def1 is set for one average value AVEa for calculating the HD degree (relative value), and an initial value def2 is set for the other average value AVEb is shown.

Similar to the first local region selecting method shown in FIG. 6, the local region selecting unit 114 selects one local region (S202).

Similar to the first local region selecting method shown in FIG. 6, the local region selecting unit 114 determines whether or not the reliability (third reliability) of the local region selected in step S202 is high (S204). If determined that the reliability (third reliability) of the selected local region is not high in step S204, the local region selecting unit 114 terminates the process in the selected local region (S212).

Similar to the first local region selecting method shown in FIG. 6, if determined that the reliability (third reliability) of the selected local region is high in step S204, the local region selecting unit 114 sets the average value calculated in the selected local region as an average value candidate for calculating the HD degree (relative value) (S206). In FIG. 7, an example where ave1 calculated by the first average value calculating part 158 in the selected local region is set as one average value candidate AVEc, and ave2 calculated by the second average value calculating part 160 in the selected local region is set as the other average value candidate AVEd is shown.

After the average value candidates are set in step S206, the local region selecting unit 114 determines whether or not it is the local region at where greater HD degree (relative value) can be calculated (S208). The determination in step S208 can be made from whether or not the conditional equation "{log (AVEd)−log(AVEc)}>{log(AVEb)−log(AVEa)}" is satisfied as shown in FIG. 7.

As shown in step S206, the second local region selecting method differs from the first local region selecting method shown in FIG. 6 in that determination is made on whether or not it is the local region at where greater HD degree (relative value) can be calculated using logarithm (common logarithm). However, the local region selecting unit 114 can select the local region satisfying the condition 1-2 (whether it is the local region at where the highest HD degree (relative value) can be calculated) even when determination is made using logarithm.

If determined that the first condition is satisfied in step S208, the local region selecting unit 114 updates the average value for calculating the HD degree (relative value) (S210), similar to the first local region selecting method shown in FIG. 6. In FIG. 7, an example where one average value AVEa for calculating the HD degree (relative value) is updated to the average value candidate AVEc, and the other average value AVEb is updated to the average value candidate AVEd is shown. After the average value is updated in step S210, the local region selecting unit 114 terminates the process in the selected local region (S212).

If determined that the first condition is not satisfied in step S208, the local region selecting unit 114 terminates the process in the selected local region (S212), similar to the first local region selecting method shown in FIG. 6.

After the process in the selected local region is terminated in step S212, the local region selecting unit 114 determines whether or not all the local regions are processed (S214), similar to the first local region selecting method shown in FIG. 6.

If not determined that all the local regions are processed in step S214, the local region selecting unit 114 repeats the processes from step S202, similar to the first local region selecting method shown in FIG. 6.

If determined that all the local regions are processed in step S214, a set of average values (AVEa, AVEb) for calculating the HD degree (relative value) are output (S216), similar to the first local region selecting method shown in FIG. 6.

Therefore, the second local region selecting method differs from the first local region selecting method shown in FIG. 6 in that determination is made on whether or not it is the local region at where greater HD degree (relative value) can be calculated using logarithm (common logarithm). However, through the processes of steps S200 to S216 shown in FIG. 7, the image determining device 100 can determine whether or not the first condition (condition 1-1 and condition 1-2) is satisfied for each local region, and output the set of average values (AVEa, AVEb) for calculating the HD degree (relative value), similar to when using the first local region selecting method shown in FIG. 6.

In the second local region selecting method shown in FIG. 7, the initial values (def1, def2) can be output as the set of average values if the reliability (third reliability) of all the local regions is low, similar to the first local region selecting method shown in FIG. 6. Therefore, the image determining device 100 using the second local region selecting method can also select "not select local region for performing image determination".

The image determining device 100 will again be described with reference to FIG. 5. The local region selecting unit 114 can select the local region satisfying the first condition (condition 1-1 and condition 1-2) and output the set of average values (AVEa, AVEb) in the local region by using the first or the second local region selecting methods described above.

The local region selecting unit 114 outputs the set of average values (AVEa, AVEb) in the first local region selecting method shown in FIG. 6 and the second local region selecting method shown in FIG. 7, but the local region selecting method according to the embodiment of the present invention is not limited thereto. For instance, the local region selecting unit 114 can output an index number of the local region satisfying the first condition. The local region selecting unit 114 can output the index number corresponding to the local region (selected local region) satisfying the first condition using a look up table in which the local region (e.g., reference position of local region) and the index number of the local region are corresponded to each other. The look up table may be stored in the storage unit (not shown) of the image determining device 100, and appropriately read out from the storage unit of the image determining device 100 by the local region selecting unit 114. It should be recognized that the information recorded in the look up table may be updated according to the setting of the local region.

When using the method in which the local region selecting unit 114 outputs the index number of the local region, the local region selecting unit 114 can output an exception number that does not indicate any local region if the reliability (third reliability) of all the local regions is low. Therefore, the image determining device 100 using the first or the second local region selecting method can also select "not select local region for performing image determination".

The average value selecting unit 116 selectively outputs the set of average values (average value output from the first average value calculating part 158 and average value output from the second average value calculating part 160) corresponding to the local region selected in the local region selecting unit 114 from the average values of each local region output from the average value calculating unit 106.

[First Average Value Selecting Method: Method of Using Set of Average Values (AVEa, AVEb)]

When the set of average values (AVEa, AVEb) is output from the local region selecting unit 114, the average value selecting unit 116 performs a matching process between the set of average values (AVEa, AVEb) and the average value of each local region output from the average value calculating unit 106. The average value selecting unit 116 outputs a set of average values that matches the set of average values (AVEa, AVEb). If the set of average values that matches the set of average values (AVEa, AVEb) does not exist, that is, if the initial values (def1, def2) are output as the set of average values from the local region selecting unit 114, the average value selecting unit 116 can output the set of average values (AVEa, AVEb)=(def1, def2) output from the local region selecting unit 114.

[Variant of First Average Value Selecting Method]

Therefore, the average value selecting unit 116 using the first average value selecting method can output the set of average values (AVEa, AVEb) output from the local region selecting unit 114 irrespective of the result of matching process. Therefore, the image determining device according to the embodiment of the present invention is not limited to a configuration of including the local region selecting unit 114 and the average value selecting unit 116 as separate bodies, and can output the set of average values (AVEa, AVEb) in the local region satisfying the first condition even if the local region selecting unit 114 and the average value selecting unit 116 are formed as an integrated body.

[Second Average Value Selecting Method: Method of Using Index of Local Region]

When the index number of the selected local region is output from the local region selecting unit 114, the average value selecting unit 116 can selectively output the set of average values of the local region corresponding to the index number. The average value selecting unit 116 uses the look up table in which the local region and the index number of the local region are corresponded to selectively output the set of average values of the local region. The look up table used for the selection of the local region may be, for example, stored in the storage unit (not shown) of the image determining device 100, and appropriately read out from the storage unit of the image determining device 100 by the average value selecting unit 116, but it is not limited thereto. The look up table may be stored in the external device of the image determining device 100, and the look up table may be appropriately read out through the wired/wireless network etc. by the average value selecting unit 116.

If the exception number which does not indicate any local region is output from the local region selecting unit 114, the average value selecting unit 116 may "not output the set of average values", and the like. In the above case, the average value selecting unit 116 can record the log information indicating not to perform image determination in the storage unit (not shown) of the image determining device 100, but it is not limited thereto.

The average value selecting unit 116 can selectively output the set of average values corresponding to the local region selected in the local region selecting unit 114 from the average value of each local region output from the average value calculating unit 106 by using the above method.

The relative value calculating unit 118 calculates a relative value from the set of average values output from the average value selecting unit 116. Here, the relative value calculated by the relative value calculating unit 118 corresponds to the HD degree shown in Equation 1. Therefore, the calculation of the relative value in the relative value calculating unit 118 complies with Equation 1, and can be obtained with the following Equation 2.

HD degree=relative value calculated by relative value calculating unit 118=(average value in selected local region calculated by second average value calculating part 160)/(average value in selected local region calculated by first average value calculating part 158)　　(Equation 2)

The method of calculating the relative value, that is, the HD degree calculated by the relative value calculating unit 118 is not limited to Equation 2, and may be obtained with the following Equation 3 using logarithm (common logarithm).

HD degree=relative value calculated by relative value calculating unit 118=log(average value in selected local region calculated by second average value calculating part 160)−log(average value in selected local region calculated by first average value calculating part 158)　　(Equation 3)

The image determining unit 120 performs a determination of the image using the relative value, that is, the HD degree calculated by the relative value calculating unit 118. The image to be determined has a very high probability of being the image of pseudo-HD resolution as the HD degree calculated by the relative value calculating unit 118 takes a value closer to 0 (zero). The image to be determined has a very high probability of being the image of HD resolution as the HD degree calculated by the relative value calculating unit 118 takes a value closer to 1. Therefore, based on the predetermined threshold value, the image determining unit 120 determines the image as the image of HD resolution if the HD degree is greater than or equal to the threshold value, and determines the image as the image of pseudo-HD resolution if the HD degree is smaller than the threshold value.

The determination of the image in the image determining unit 120 is not limited to the above, and the value of the HD degree itself may be handled as a probability value of being the image of HD resolution, and the correctness of being the image of HD resolution may be determined.

Therefore, the image determining device 100 according to the first embodiment of the present invention uses the difference in the frequency amplitude characteristic between the image of HD resolution and the image of pseudo-HD resolution as shown in FIG. 2 to perform determination of the image based on the relative value of the average value of the amplitude characteristic value in the mid-range frequency band with respect to the average value of the amplitude characteristic value in the low-range frequency band.

Therefore, the image determining device 100 according to the first embodiment does not necessarily require the addition of the side panel when the image of the SD resolution is up-converted as in the image determining device of the related art, and can perform determination of the image regardless of with which up-conversion method the image was up-converted.

The image determining device 100 divides the image indicated by the image signal to a plurality of local regions, and uses the "relative value" as the image information to select the "local region containing the most high definition image signal". The image determining device 100 then can perform image determination on the selected local region.

Therefore, the image determining device 100 can alleviate the processes related to image determination and reduce the resources related to image determination compared to when performing image determination on all the local regions. The image determining device 100 can perform image determination based on the local region containing the most high definition image signal, and thus when correcting the image using the image determination result determined by the image determining device 100, for example, correction corresponding to the "local region containing the most high definition image signal" (region in which the possibility the important information exists is high) can be performed on the image.

Furthermore, the image determining device 100 sets, for each local region, the "reliability (third reliability)" set based on the factors that lower the reliability of the determination result of the image or (1) number of samples of the amplitude characteristic value and (2) value of average value of the amplitude characteristic value. The image determining device 100 can select the local region to perform image determination based on the "reliability" set for each local region.

Therefore, the image determining device 100 can reduce erroneous determination in the determination of the image.

[Variant of Image Determining Device 100 According to the First Embodiment]

In the image determining device 100 according to the first embodiment described above, a configuration where the local region selecting unit 114 selects one local region, and calculates the relative value with respect to the selected local region to perform image determination has been described. However, the image determining device according to the first embodiment of the present invention is not limited to such configuration.

The image determining device according to a variant of the first embodiment may, for instance, select a plurality of local regions and perform image determination (number of local regions to be selected is smaller than or equal to total number of local regions). The image determining device according to a variant of the first embodiment may, for instance, perform image determination through the following procedures (A) to (C).

(A) Select Local Region

The image determining device according to the variant of the first embodiment selects a plurality of local regions in the order of local region having large calculated HD degree (relative value), in addition to condition 1-1. The selection of the local region in the first variant includes, for example, calculating the relative value of the local region which reliability (third reliability) of the local region is high, and sorting the same in the order of large values, but is not limited thereto. The process of (A) may be performed by the local region selecting unit etc.

(B) Calculate Relative Value

The image determining device according to the variant of the first embodiment calculates the relative value with respect to each selected local region.

(C) Determine Image

The image determining device according to the variant of the first embodiment performs image determination based on the plurality of calculated relative values. The determination of image in (C) may be performed by comparing the total number of relative values which relative value is smaller than a predetermined threshold value and the total number of relative values which relative value is greater than or equal to the predetermined threshold value, and determining which total number is larger, but is not limited thereto.

The image determining device according to the variant of the first embodiment thus can select a plurality of local regions and perform image determination through the processes (A) to (C) described above.

(Program Related to Image Determination)

The determination of image can be performed regardless of with which up-conversion method the image was up-converted by a program for causing a computer to function as the image determining device 100 according to the first embodiment of the present invention.

(Second Embodiment)

In the image determining device according to the first embodiment of the present invention describe above, a configuration of selecting the local region satisfying the first condition and performing image determination has been described. However, the selecting condition of the local region in the image determining device according to the embodiment of the present invention is not limited to the first condition. An image determining device according to a second embodiment in which the selecting condition of the local region is different will be described below.

Figure 8:
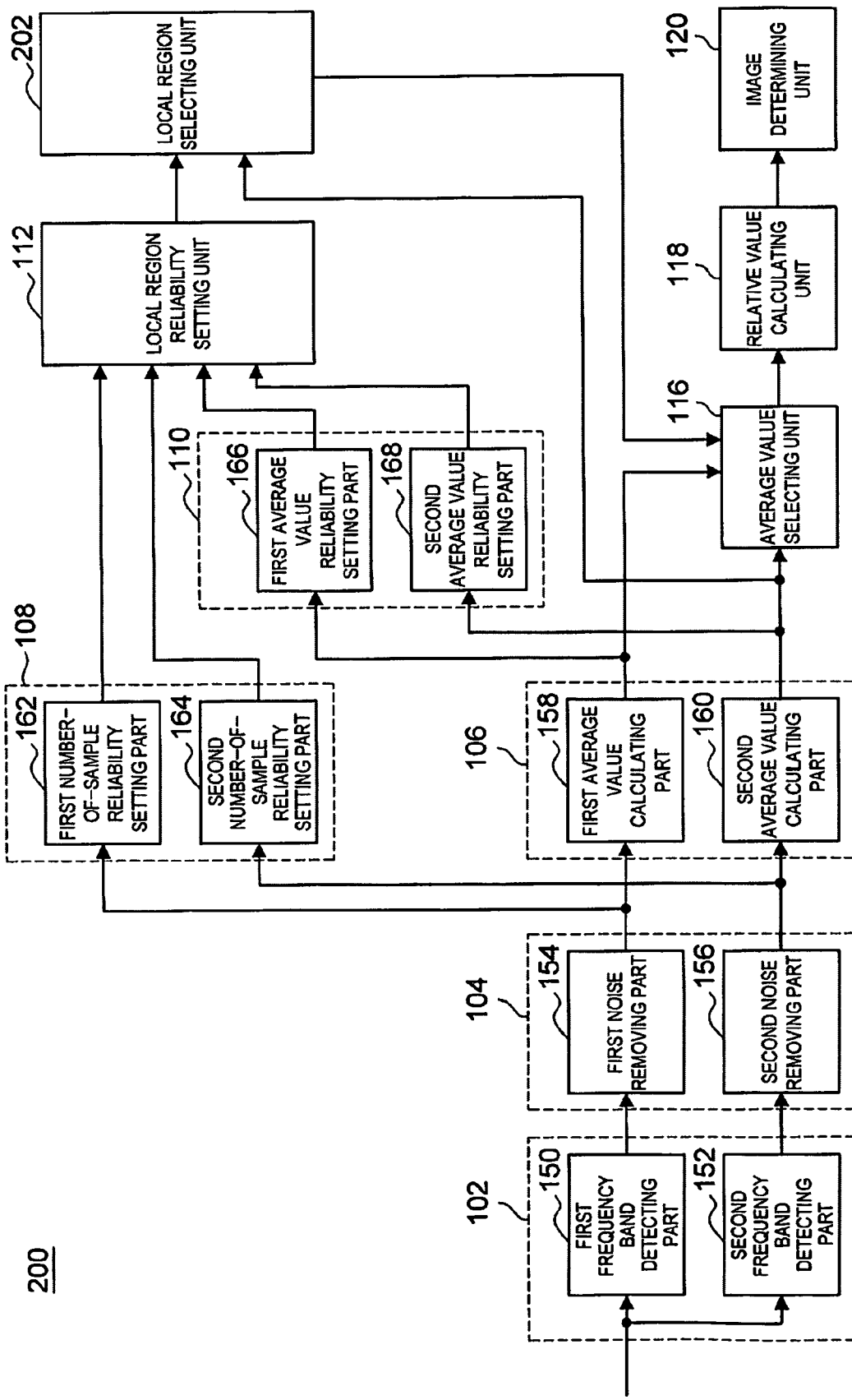
FIG. 8 is a block diagram showing an image determining device according to a second embodiment of the present invention.

FIG. 8 is a block diagram showing an image determining device 200 according to the second embodiment of the present invention.

With reference to FIG. 8, the image determining device 200 according to the second embodiment of the present invention basically has the same configuration as the configuration of the image determining device 100 according to the first embodiment, but the selecting condition of the local region in the local region selecting unit 202 is different compared to the image determining device 100.

The image determining device 200 may include a control unit (not shown) configured by an MPU and the like, a ROM (not shown), a RAM (not shown), a storage unit (not shown), a receiving unit (not shown), an operation unit (not shown), and the like, similar to the image determining device 100 according to the first embodiment.

The frequency band signal detecting unit 102, the noise removing unit 104, the average value calculating unit 106, the number-of-samples reliability setting unit 108, the average value reliability setting unit 110, the local region reliability setting unit 112, the average value selecting unit 116, the relative value calculating unit 118, and the image determining unit 120 have the same functions as those of the image determining device 100 according to the first embodiment. Therefore, the image determining device 200 uses the difference in frequency amplitude characteristic of the image of HD resolution and the image of pseudo-HD resolution as shown in FIG. 2 to perform determination of image based on the relative value of the average value of the amplitude characteristic value in the mid-range frequency band with respect to the average value of the amplitude characteristic value in the low-range frequency band.

The local region selecting unit 202 can select one region to use for image determination from each local region using the image information or information derived from the image signal. Specifically, the local region selecting unit 202 selects a local region satisfying the following second condition using "reliability (third reliability) of local region" and "average value of higher range frequency component" as the image information.

<Second Condition>

Condition 2-1: Local region in which reliability (third reliability) of local region is high Condition 2-2: Local region at where average value (i.e., average value of higher range frequency component) calculated by the second average value calculating part 160 is the largest The local region selecting unit 202 selects the local region that contains great amount of high-range frequency component, that has high contrast, and that visually stands out by having the condition 2-2 as the selecting condition of the location region.

To determine the local region satisfying the second condition, the local region selecting unit 202 is input with the third reliability for each local region set by the local region reliability setting unit 112, and the average value for each local region calculated by the second average value calculating part 160.

The local region selecting unit 202 selects the local region satisfying the second condition, and outputs an index number corresponding to the selected local region. The local region selecting unit 202 can output the index number corresponding to the local region (selected local region) satisfying the second condition using a look up table in which the local region and the index number of the local region are corresponded to each other.

Therefore, the image determining device 200 can perform image determination on the local region satisfying the second condition in the local region selecting unit 202.

Similar to the image determining device 100 according to the first embodiment, the image determining device 200 according to the second embodiment of the present invention uses the difference in the frequency amplitude characteristic between the image of HD resolution and the image of pseudo-HD resolution as shown in FIG. 2 to perform determination of the image based on the relative value of the average value of the amplitude characteristic value in the mid-range frequency band with respect to the average value of the amplitude characteristic value in the low-range frequency band.

Therefore, the image determining device 200 according to the second embodiment does not necessarily require the addition of the side panel when the image of the SD resolution is up-converted as in the image determining device of the related art, and can perform determination of the image regardless of with which up-conversion method the image was up-converted.

The image determining device 200 divides the image indicated by the image signal to a plurality of local regions, and uses the "average value of higher range frequency component" as the image information to select the "local region that contains great amount of high-range frequency component, that has high contrast and that visually stands out". The image determining device 200 then can perform image determination on the selected local region.

Therefore, similar to the image determining device 100 according to the first embodiment, the image determining device 200 can alleviate the processes related to image determination and reduce the resources related to image determination compared to when performing image determination on all the local regions. The image determining device 200 can perform image determination based on the "local region that contains great amount of high-range frequency component, that has high contrast and that visually stands out", and thus when correcting the image using the image determination result determined by the image determining device 200, for example, correction corresponding to the "local region that contains great amount of high-range frequency component, that has high contrast and that visually stands out" (region in which the possibility the important information exists is high) can be performed on the image.

Furthermore, similar to the image determining device 100 according to the first embodiment, the image determining device 200 sets, for each local region, the "reliability (third reliability)" set based on the factors that lower the reliability of the determination result of the image or (1) number of samples of the amplitude characteristic value and (2) value of average value of the amplitude characteristic value. The image determining device 200 can select the local region to perform image determination based on the "reliability" set for each local region.

Therefore, the image determining device 200 can reduce erroneous determination in the determination of the image.

[Variant of Image Determining Device 200 According to the Second Embodiment]

In the image determining device 200 according to the second embodiment described above, a configuration where the local region selecting unit 202 selects one local region, and calculates the relative value with respect to the selected local region to perform image determination has been described. However, the image determining device according to the second embodiment of the present invention is not limited to such configuration. The image determining device according to the variant of the second embodiment may select a plurality of local regions and perform image determination, similar to the variant of the image determining device according to the first embodiment.

The image determining device according to the variant of the second embodiment may select a plurality of local regions in the order of local region having large average value calculated by the second average value calculating part 160, in addition to condition 2-1, but the selecting unit is not limited thereto.

(Program Related to Image Determination)

The determination of image can be performed regardless of with which up-conversion method the image was up-converted by a program for causing a computer to function as the image determining device 200 according to the second embodiment of the present invention.

(Third Embodiment)

In the image determining device according to the first and the second embodiments of the present invention, a configuration of selecting a local region satisfying the first condition or the second condition, and performing image determination has been described. However, the selecting condition of the local region in the image determining device according to the embodiment of the present invention is not limited to the first and the second conditions. An image determining device according to a third embodiment having a different local region selecting condition will now be described.

Figure 9:
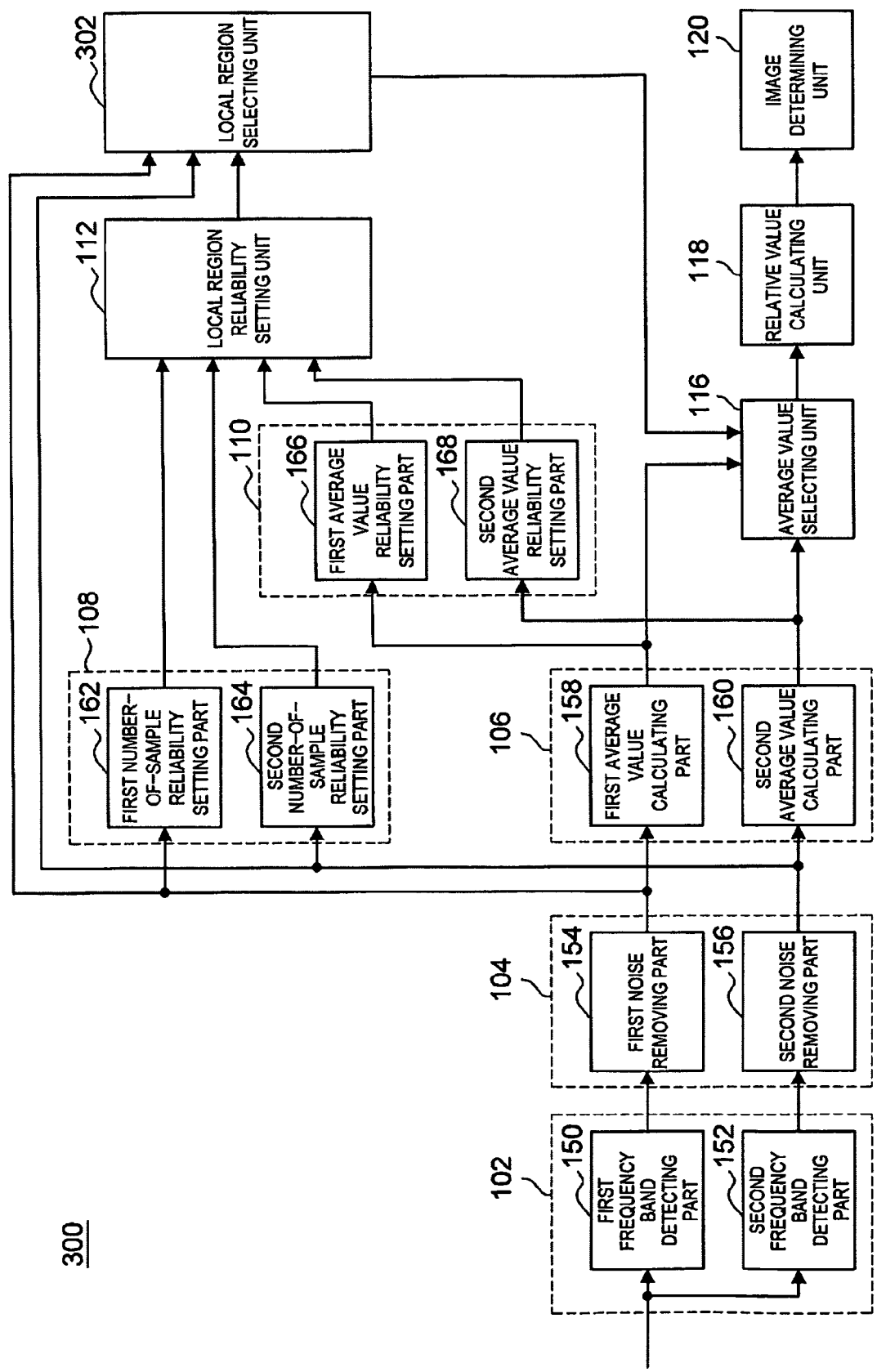
FIG. 9 is a block diagram showing an image determining device according to a third embodiment of the present invention.

FIG. 9 is a block diagram showing an image determining device 300 according to a third embodiment of the present invention.

With reference to FIG. 9, the image determining device 300 according to the third embodiment of the present invention basically has the same configuration as the configuration of the image determining device 100 according to the first embodiment, but the selecting condition of the local region in a local region selecting unit 302 is different compared to the image determining device 100.

The image determining device 300 may include a control unit (not shown) configured by an MPU and the like, a ROM (not shown), a RAM (not shown), a storage unit (not shown), a receiving unit (not shown), an operation unit (not shown), and the like, similar to the image determining device 100 according to the first embodiment.

The frequency band signal detecting unit 102, the noise removing unit 104, the average value calculating unit 106, the number-of-samples reliability setting unit 108, the average value reliability setting unit 110, the local region reliability setting unit 112, the average value selecting unit 116, the relative value calculating unit 118, and the image determining unit 120 have the same functions as those of the image determining device 100 according to the first embodiment. Therefore, the image determining device 300 uses the difference in frequency amplitude characteristic of the image of HD resolution and the image of pseudo-HD resolution as shown in FIG. 2 to perform determination of image based on the relative value of the average value of the amplitude characteristic value in the mid-range frequency band with respect to the average value of the amplitude characteristic value in the low-range frequency band.

The local region selecting unit 302 can select one region to use for image determination from each local region using the image information or information derived from the image signal. Specifically, the local region selecting unit 302 selects a local region satisfying the following third condition using "reliability (third reliability) of local region" and "number of samples of the amplitude characteristic value used in the calculation of the average value" as the image information.

<Third Condition>

Condition 3-1: Local region in which reliability (third reliability) of local region is high Condition 3-2: Local region at where number of samples of the amplitude characteristic value used in the calculation of the average value is the largest The local region selecting unit 302 selects the local region that contains great amount of image signal component by having the condition 3-2 as the selecting condition of the location region. The local region selecting unit 302 selects the local region satisfying the condition 3-2, so that the image determining device 300 can perform image determination according to the region where the proportion of a picture having a high possibility the user viewing the image (or video) indicated by the image signal will pay attention is large, that is, region in which the possibility the important information exists is high.

To determine the local region satisfying the third condition, the local region selecting unit 302 is input with the third reliability for each local region set by the local region reliability setting unit 112, and the image signal removed with noise in the noise removing unit 104 for each local region.

The local region selecting unit 302 selects the local region satisfying the third condition, and outputs an index number corresponding to the selected local region. The local region selecting unit 302 can output the index number corresponding to the local region (selected local region) satisfying the third condition using a look up table in which the local region and the index number of the local region are corresponded to each other.

Therefore, the image determining device 300 can perform image determination on the local region satisfying the third condition in the local region selecting unit 302.

Similar to the image determining device 100 according to the first embodiment, the image determining device 300 according to the third embodiment of the present invention uses the difference in the frequency amplitude characteristic between the image of HD resolution and the image of pseudo-HD resolution as shown in FIG. 2 to perform determination of the image based on the relative value of the average value of the amplitude characteristic value in the mid-range frequency band with respect to the average value of the amplitude characteristic value in the low-range frequency band.

Therefore, the image determining device 300 according to the third embodiment does not necessarily require the addition of the side panel when the image of the SD resolution is up-converted as in the image determining device of the related art, and can perform determination of the image regardless of with which up-conversion method the image was up-converted.

The image determining device 300 divides the image indicated by the image signal to a plurality of local regions, and uses the "number of samples of the amplitude characteristic value used in the calculation of the average value" as the image information to select the "local region that contains great amount of image signal component". The image determining device 300 then can perform image determination on the selected local region.

Therefore, similar to the image determining device 100 according to the first embodiment, the image determining device 300 can alleviate the processes related to image determination and reduce the resources related to image determination compared to when performing image determination on all the local regions. The image determining device 300 can perform image determination based on the "local region that contains great amount of image signal component", and thus when correcting the image using the image determination result determined by the image determining device 300, for example, correction corresponding to the "local region that contains great amount of image signal component" (region in which the possibility the important information exists is high) can be performed on the image.

Furthermore, similar to the image determining device 100 according to the first embodiment, the image determining device 300 sets, for each local region, the "reliability (third reliability)" set based on the factors that lower the reliability of the determination result of the image or (1) number of samples of the amplitude characteristic value and (2) value of average value of the amplitude characteristic value. The image determining device 300 can select the local region to perform image determination based on the "reliability" set for each local region.

Therefore, the image determining device 300 can reduce erroneous determination in the determination of the image.

[Variant of Image Determining Device 300 According to the Third Embodiment]

In the image determining device 300 according to the third embodiment described above, a configuration where the local region selecting unit 302 selects one local region, and calculates the relative value with respect to the selected local region to perform image determination has been described. However, the image determining device according to the third embodiment of the present invention is not limited to such configuration. The image determining device according to the variant of the third embodiment may select a plurality of local regions and perform image determination, similar to the variant of the image determining device according to the first embodiment.

The image determining device according to the variant of the third embodiment may select a plurality of local regions in the order of local region having large number of samples of the amplitude characteristic value in the image signal removed with noise in the noise removing unit 104, in addition to condition 3-1, but the selecting unit is not limited thereto.

(Program Related to Image Determination)

The determination of image can be performed regardless of with which up-conversion method the image was up-converted by a program for causing a computer to function as the image determining device 300 according to the third embodiment of the present invention.

(Fourth Embodiment)

In the image determining device according to the first to the third embodiments of the present invention, a configuration of selecting a local region satisfying one of the first condition to the third condition, and performing image determination has been described. However, the selecting condition of the local region in the image determining device according to the embodiment of the present invention is not limited to the first to the third conditions. An image determining device according to a fourth embodiment having a different local region selecting condition will now be described.

Figure 10:
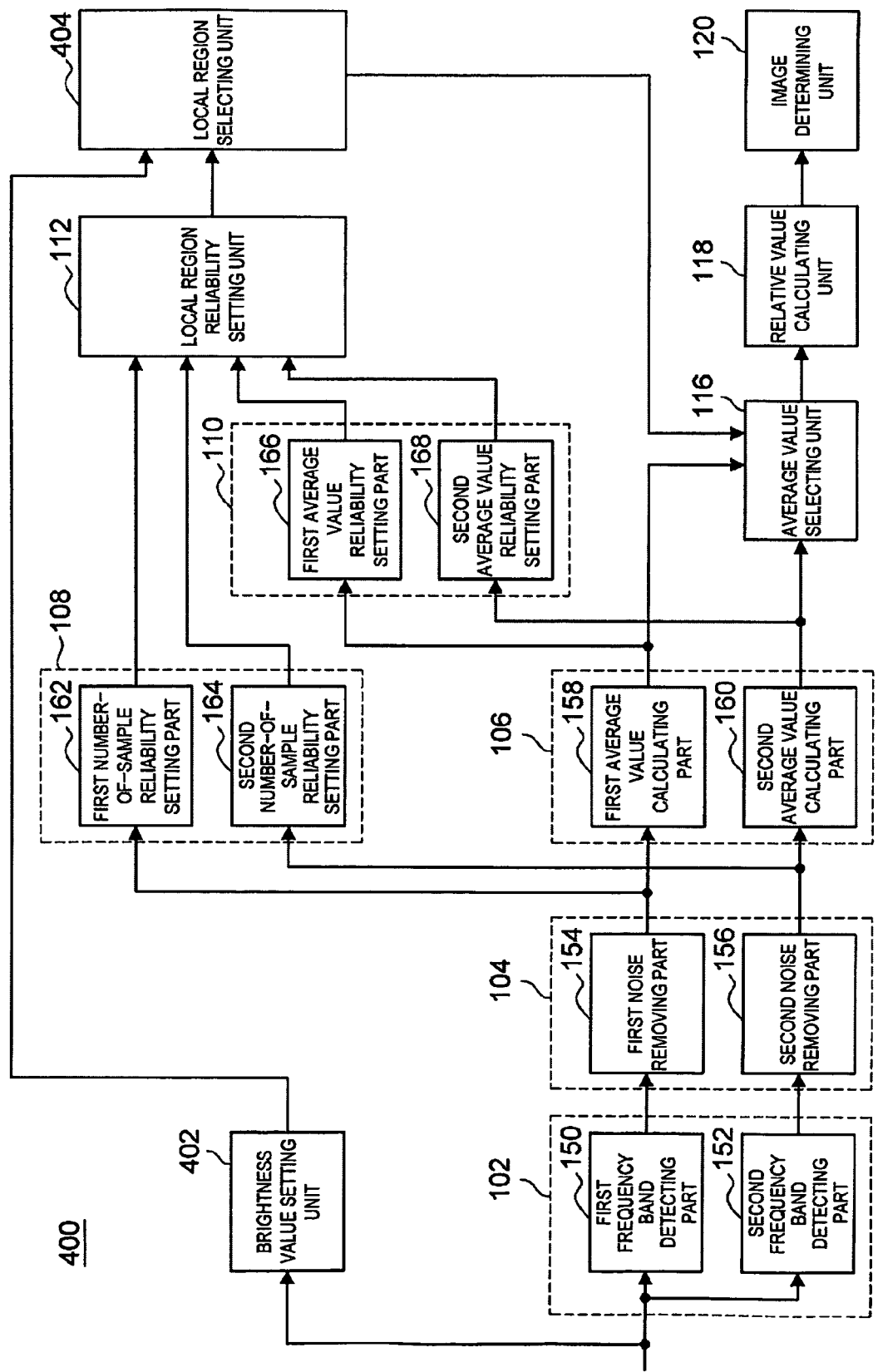
FIG. 10 is a block diagram showing an image determining device according to a fourth embodiment of the present invention.

FIG. 10 is a block diagram showing an image determining device 400 according to a fourth embodiment of the present invention.

With reference to FIG. 10, the image determining device 400 according to the fourth embodiment of the present invention basically has the same configuration as the configuration of the image determining device 100 according to the first embodiment, but a brightness value setting unit 402 is further arranged, in that and the selecting condition of the local region in a local region selecting unit 404 is different compared to the image determining device 100.

The image determining device 400 may include a control unit (not shown) configured by an MPU and the like, a ROM (not shown), a RAM (not shown), a storage unit (not shown), a receiving unit (not shown), an operation unit (not shown), and the like, similar to the image determining device 100 according to the first embodiment.

The frequency band signal detecting unit 102, the noise removing unit 104, the average value calculating unit 106, the number-of-samples reliability setting unit 108, the average value reliability setting unit 110, the local region reliability setting unit 112, the average value selecting unit 116, the relative value calculating unit 118, and the image determining unit 120 have the same functions as those of the image determining device 100 according to the first embodiment. Therefore, the image determining device 400 uses the difference in frequency amplitude characteristic of the image of HD resolution and the image of pseudo-HD resolution as shown in FIG. 2 to perform determination of image based on the relative value of the average value of the amplitude characteristic value in the mid-range frequency band with respect to the average value of the amplitude characteristic value in the low-range frequency band.

The brightness value setting unit 402 sets a brightness value indicating the brightness of each signal in each local region for each local region based on the input image signal.

The brightness value setting unit 402 can set the brightness value in each local region by calculating the average value of the luminance signal for each local region, but is not limited thereto. For instance, the brightness value setting unit 402 may set the most frequency value (mode) of the median value (median) of the luminance signal in each local region as the brightness value in each local region.

The brightness value setting unit 402 can uniquely set the brightness value in each local region using the look up table in which the value of the luminance signal and the brightness value are corresponded. The look up table may be stored in the storage unit (not shown) of the image determining device 400, and appropriately read out from the storage unit of the image determining device 400 by the brightness value setting unit 402. It should be noted that the look up table may be stored in the storage unit arranged in the brightness value setting unit 402. The storage unit arranged in the brightness value setting unit 402 may be a non-volatile memory such as EEPROM, flash memory, and the like, but is not limited thereto.

Each local region which brightness value is set by the brightness value setting unit 402 may be a region same as each local region to be performed with filtering by the frequency band signal detecting unit 102. Each local region which brightness value is set by the brightness value setting unit 402 may be set in advance, but is not limited thereto. Each local region which brightness value is set by the brightness value setting unit 402 may be appropriately set according to the user input from the user using the image determining device 400.

The local region selecting unit 404 can select one region to use for image determination from each local region using the image information or information derived from the image signal. Specifically, the local region selecting unit 404 selects a local region satisfying the following fourth condition using "reliability (third reliability) of local region" and "brightness value" as the image information.

<Four Condition>

Condition 4-1: Local region in which reliability (third reliability) of local region is high Condition 4-2: Local region in which the brightness value takes a value closest to the brightness reference value The local region selecting unit 404 selects the local region indicating the brightness to which the user viewing the image (or video) indicated by the image signal tends to pay attention, that is, region in which the possibility the important information exists is high by having the condition 4-2 as the selecting condition of the local region.

The local region selecting unit 404 may determine the local region in which the magnitude of the absolute value of the difference between the brightness value set by the brightness value setting unit 402 and the brightness reference value is the smallest as the local region satisfying the condition 4-2, but is not limited thereto. The brightness reference value used for the local region selecting unit 404 to determine the condition 4-2 can be stored in the storage unit arranged in the local region selecting unit 404. The storage unit arranged in the local region selecting unit 404 may be a non-volatile memory such as EEPROM, flash memory, and the like, but is not limited thereto. The brightness reference value may be a predetermined fixed value (brightness value indicating the brightness the sight of the user easily concentrates), but is not limited thereto, and may be appropriately changed according to the user input.

To determine the local region satisfying the fourth condition, the local region selecting unit 404 is input with the third reliability for each local region set by the local region reliability setting unit 112, and the brightness value set for each local region by the brightness value setting unit 402.

The local region selecting unit 404 selects the local region satisfying the fourth condition, and outputs an index number corresponding to the selected local region. The local region selecting unit 404 can output the index number corresponding to the local region (selected local region) satisfying the fourth condition using a look up table in which the local region and the index number of the local region are corresponded to each other.

Therefore, the image determining device 400 can perform image determination on the local region satisfying the fourth condition in the local region selecting unit 404.

Similar to the image determining device 100 according to the first embodiment, the image determining device 400 according to the fourth embodiment of the present invention uses the difference in the frequency amplitude characteristic between the image of HD resolution and the image of pseudo-HD resolution as shown in FIG. 2 to perform determination of the image based on the relative value of the average value of the amplitude characteristic value in the mid-range frequency band with respect to the average value of the amplitude characteristic value in the low-range frequency band.

Therefore, the image determining device 400 according to the fourth embodiment does not necessarily require the addition of the side panel when the image of the SD resolution is up-converted as in the image determining device of the related art, and can perform determination of the image regardless of with which up-conversion method the image was up-converted.

The image determining device 400 divides the image indicated by the image signal to a plurality of local regions, and uses the "brightness value and the brightness reference value" as the image information to select the "local region in which the brightness value takes a value closest to the brightness reference value". The image determining device 400 then can perform image determination on the selected local region.

Therefore, similar to the image determining device 100 according to the first embodiment, the image determining device 400 can alleviate the processes related to image determination and reduce the resources related to image determination compared to when performing image determination on all the local regions. The image determining device 400 can perform image determination based on the "local region in which the brightness value takes a value closest to the brightness reference value", and thus when correcting the image using the image determination result determined by the image determining device 400, for example, correction corresponding to the "local region in which the brightness value takes a value closest to the brightness reference value" (region in which the possibility the important information exists is high) can be performed on the image.

Furthermore, similar to the image determining device 100 according to the first embodiment, the image determining device 400 sets, for each local region, the "reliability (third reliability)" set based on the factors that lower the reliability of the determination result of the image or (1) number of samples of the amplitude characteristic value and (2) value of average value of the amplitude characteristic value. The image determining device 400 can select the local region to perform image determination based on the "reliability" set for each local region.

Therefore, the image determining device 400 can reduce erroneous determination in the determination of the image.

[Variant of Image Determining Device 400 According to the Fourth Embodiment]

In the image determining device 400 according to the fourth embodiment described above, a configuration where the local region selecting unit 404 selects one local region, and calculates the relative value with respect to the selected local region to perform image determination has been described. However, the image determining device according to the fourth embodiment of the present invention is not limited to such configuration. The image determining device according to the variant of the fourth embodiment may select a plurality of local regions and perform image determination, similar to the variant of the image determining device according to the first embodiment.

The image determining device according to the variant of the fourth embodiment may select a plurality of local regions according to following references (i), (ii), in addition to the condition 4-1.

(i) in the order of local region which brightness value is close to the brightness reference value;

(ii) local region closest to each of the plurality of set brightness reference values.

It should be noted that the selecting unit in the image determining device according to the variant of the fourth embodiment is not limited to (i) and (ii).

(Program Related to Image Determination)

The determination of image can be performed regardless of with which up-conversion method the image was up-converted by a program for causing a computer to function as the image determining device 400 according to the fourth embodiment of the present invention.

(Fifth Embodiment)

In the image determining device according to the first to the fourth embodiments of the present invention, a configuration of selecting a local region satisfying one of the first condition to the fourth condition, and performing image determination has been described. However, the selecting condition of the local region in the image determining device according to the embodiment of the present invention is not limited to the first to the fourth conditions. An image determining device according to a fifth embodiment having a different local region selecting condition will now be described.

Figure 11:
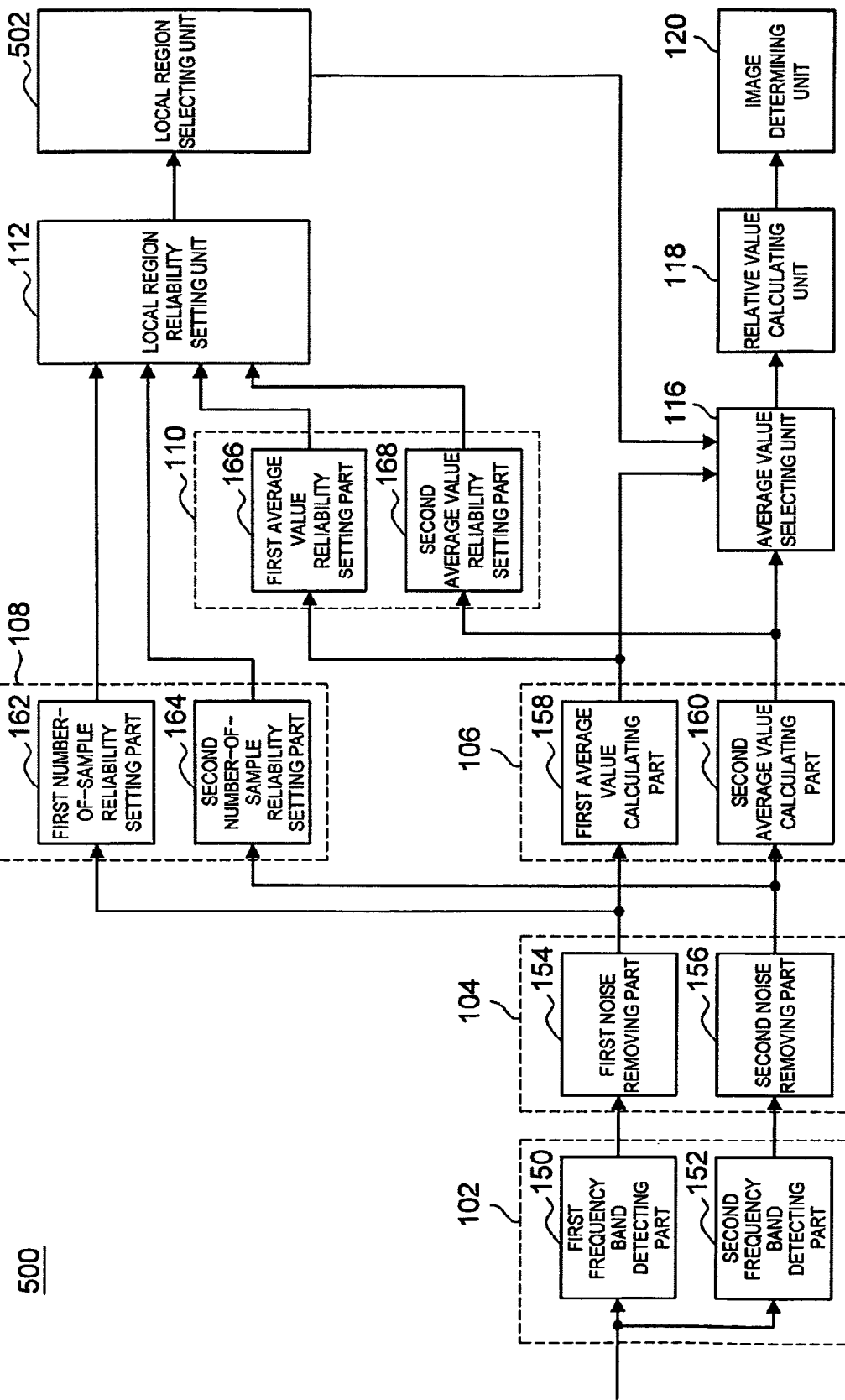
FIG. 11 is a block diagram showing an image determining device according to a fifth embodiment of the present invention.

FIG. 11 is a block diagram showing an image determining device 500 according to a fifth embodiment of the present invention.

With reference to FIG. 11, the image determining device 500 according to the fifth embodiment of the present invention basically has the same configuration as the configuration of the image determining device 100 according to the first embodiment, but the selecting condition of the local region in a local region selecting unit 502 is different compared to the image determining device 100.

The image determining device 500 may include a control unit (not shown) configured by an MPU and the like, a ROM (not shown), a RAM (not shown), a storage unit (not shown), a receiving unit (not shown), an operation unit (not shown), and the like, similar to the image determining device 100 according to the first embodiment.

The frequency band signal detecting unit 102, the noise removing unit 104, the average value calculating unit 106, the number-of-samples reliability setting unit 108, the average value reliability setting unit 110, the local region reliability setting unit 112, the average value selecting unit 116, the relative value calculating unit 118, and the image determining unit 120 have the same functions as those of the image determining device 100 according to the first embodiment. Therefore, the image determining device 500 uses the difference in frequency amplitude characteristic of the image of HD resolution and the image of pseudo-HD resolution as shown in FIG. 2 to perform determination of image based on the relative value of the average value of the amplitude characteristic value in the mid-range frequency band with respect to the average value of the amplitude characteristic value in the low-range frequency band.

The local region selecting unit 502 can select one region to use for image determination from each local region using the image information or information derived from the image signal. Specifically, the local region selecting unit 502 selects a local region satisfying the following fifth condition using "reliability (third reliability) of local region" and "distance between the center point of the image and the center point of each local region" as the image information.

<Fifth Condition>

Condition 5-1: Local region in which reliability (third reliability) of local region is high Condition 5-2: Local region closest to the center of the image indicated by the image signal.

The local region selecting unit 502 selects the local region closest to the center of the image indicated by the image signal by having the condition 5-2 as the selecting condition of the location region. The local region selecting unit 502 selects the local region satisfying the condition 5-2, so that the image determining device 500 can perform image determination according to the region close to the center portion of the image having a high possibility the user viewing the image (or video) indicated by the image signal will pay attention, that is, region in which the possibility the important information exists is high.

The local region selecting unit 502 may determine the local region in which the value of Euclidean distance between the center point of the image and the center point of each local region is the smallest as the local region satisfying the condition 5-2, but is not limited thereto.

To determine the local region satisfying the fifth condition, the local region selecting unit 502 is input with the third reliability for each local region set by the local region reliability setting unit 112.

The local region selecting unit 502 selects the local region satisfying the fifth condition, and outputs an index number corresponding to the selected local region. The local region selecting unit 502 can output the index number corresponding to the local region (selected local region) satisfying the fifth condition using a look up table in which the local region and the index number of the local region are corresponded to each other.

Therefore, the image determining device 500 can perform image determination on the local region satisfying the fifth condition in the local region selecting unit 502.

Similar to the image determining device 100 according to the first embodiment, the image determining device 500 according to the fifth embodiment of the present invention uses the difference in the frequency amplitude characteristic between the image of HD resolution and the image of pseudo-HD resolution as shown in FIG. 2 to perform determination of the image based on the relative value of the average value of the amplitude characteristic value in the mid-range frequency band with respect to the average value of the amplitude characteristic value in the low-range frequency band.

Therefore, the image determining device 500 according to the fifth embodiment does not necessarily require the addition of the side panel when the image of the SD resolution is up-converted as in the image determining device of the related art, and can perform determination of the image regardless of with which up-conversion method the image was up-converted.

The image determining device 500 divides the image indicated by the image signal to a plurality of local regions, and uses the "distance between the center point of the image and the center point of each local region" as the image information to select the "local region closest to the center of the image". The image determining device 500 then can perform image determination on the selected local region.

Therefore, similar to the image determining device 100 according to the first embodiment, the image determining device 500 can alleviate the processes related to image determination and reduce the resources related to image determination compared to when performing image determination on all the local regions. The image determining device 500 can perform image determination based on the "local region closest to the center of the image", and thus when correcting the image using the image determination result determined by the image determining device 500, for example, correction corresponding to the "local region closest to the center of the image" (region in which the possibility the important information exists is high) can be performed on the image.

Furthermore, similar to the image determining device 100 according to the first embodiment, the image determining device 500 sets, for each local region, the "reliability (third reliability)" set based on the factors that lower the reliability of the determination result of the image or (1) number of samples of the amplitude characteristic value and (2) value of average value of the amplitude characteristic value. The image determining device 500 can select the local region to perform image determination based on the "reliability" set for each local region.

Therefore, the image determining device 500 can reduce erroneous determination in the determination of the image.

[Variant of Image Determining Device 500 According to the Fifth Embodiment]

In the image determining device 500 according to the fifth embodiment described above, a configuration where the local region selecting unit 502 selects one local region, and calculates the relative value with respect to the selected local region to perform image determination has been described. However, the image determining device according to the fifth embodiment of the present invention is not limited to such configuration. The image determining device according to the variant of the fifth embodiment may select a plurality of local regions and perform image determination, similar to the variant of the image determining device according to the first embodiment.

The image determining device according to the variant of the fifth embodiment may select a plurality of local regions in the order of local region close to the center of the image, in addition to condition 5-1, but the selecting unit is not limited thereto. If the reliability of the local region is expressed with values between 0 and 1 instead of two values, the image determining device according to the fifth embodiment can select a plurality of local regions in the order of the local region with large reliability with respect to the plurality of local regions that satisfy the condition 5-1 and which distance from the center of the image is the same.

(Program Related to Image Determination)

The determination of image can be performed regardless of with which up-conversion method the image was up-converted by a program for causing a computer to function as the image determining device 500 according to the fifth embodiment of the present invention.

(Sixth Embodiment)

In the image determining device according to the first to the fifth embodiments of the present invention, a configuration of selecting a local region satisfying one of the first condition to the fifth condition, and performing image determination has been described. However, the selecting condition of the local region in the image determining device according to the embodiment of the present invention is not limited to satisfying one of the first to the fifth conditions. An image determining device according to a sixth embodiment capable of selecting the local region using a plurality of selecting conditions will now be described.

Figure 12:
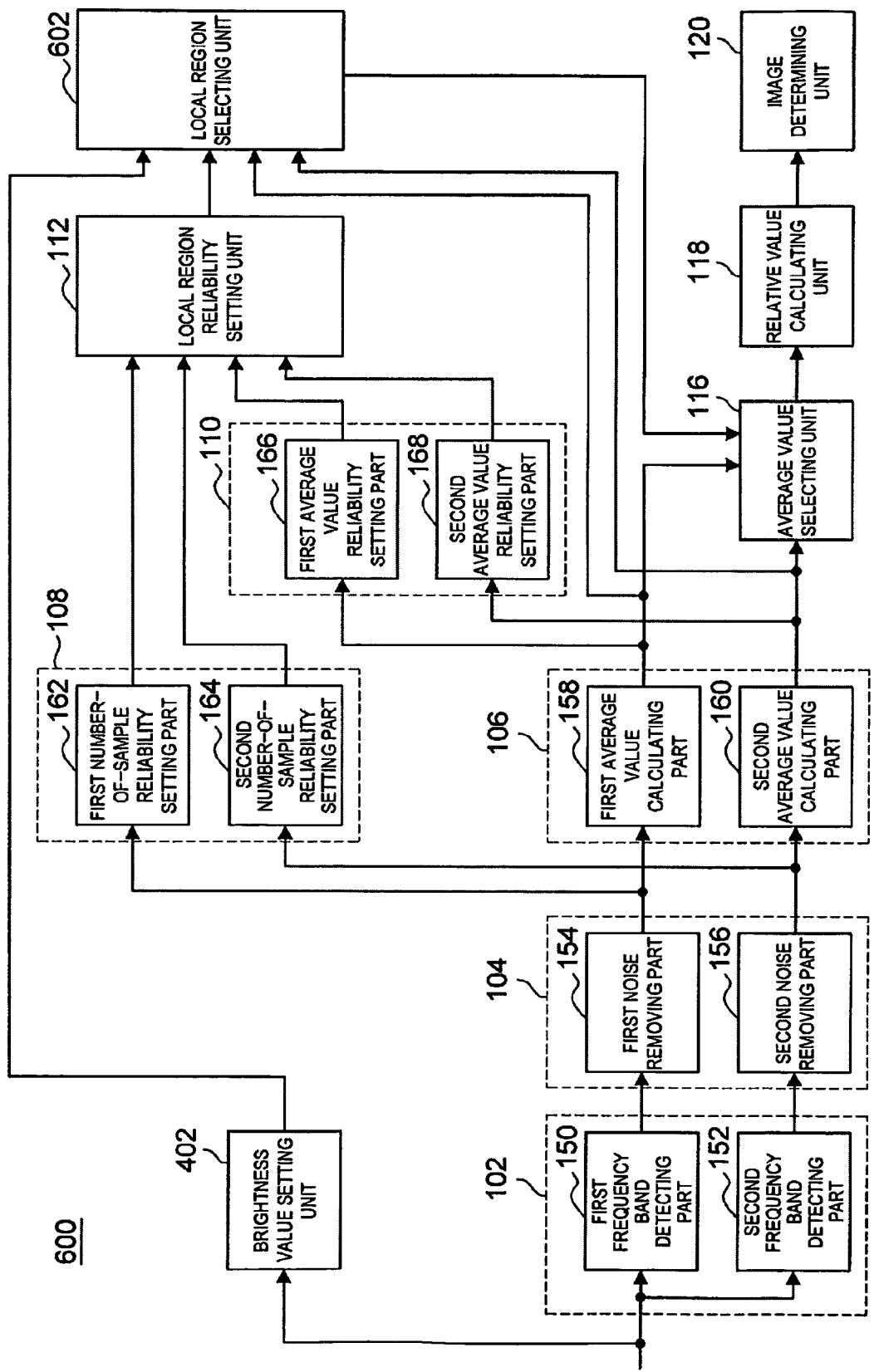
FIG. 12 is a block diagram showing an image determining device according to a sixth embodiment of the present invention.

FIG. 12 is a block diagram showing an image determining device 600 according to a sixth embodiment of the present invention.

With reference to FIG. 12, the image determining device 600 according to the sixth embodiment of the present invention basically has the same configuration as the configuration of the image determining device 400 according to the fourth embodiment, but the selecting condition of the local region in a local region selecting unit 602 is different compared to the image determining device 400.

The image determining device 600 may include a control unit (not shown) configured by an MPU and the like, a ROM (not shown), a RAM (not shown), a storage unit (not shown), a receiving unit (not shown), an operation unit (not shown), and the like, similar to the image determining device 400 according to the fourth embodiment.

The brightness value setting unit 402, the frequency band signal detecting unit 102, the noise removing unit 104, the average value calculating unit 106, the number-of-samples reliability setting unit 108, the average value reliability setting unit 110, the local region reliability setting unit 112, the average value selecting unit 116, the relative value calculating unit 118, and the image determining unit 120 have the same functions as those of the image determining device 400 according to the fourth embodiment. Therefore, the image determining device 600 uses the difference in frequency amplitude characteristic of the image of HD resolution and the image of pseudo-HD resolution as shown in FIG. 2 to perform determination of image based on the relative value of the average value of the amplitude characteristic value in the mid-range frequency band with respect to the average value of the amplitude characteristic value in the low-range frequency band.

The local region selecting unit 602 can select one region to use for image determination from each local region using the image information or information derived from the image signal. Specifically, the local region selecting unit 602 selects a local region satisfying the following sixth condition.

<Sixth Condition>

Condition 6-1: Local region in which reliability (third reliability) of local region is high Condition 6-2: Local region at where largest HD degree (relative value) can be calculated (=condition 1-2)

Condition 6-3: Local region closest to the center of the image indicated by the image signal (=condition 5-2)

Condition 6-4: Local region in which the brightness value takes a value closest to the brightness reference value (=condition 4-2)

Here, condition 6-2 corresponds to condition 1-2 according to the first embodiment, and condition 6-3 corresponds to condition 5-2 according to the fifth embodiment. Furthermore, condition 6-4 is the condition corresponding to condition 4-2 according to the fourth embodiment. Therefore, the local region selecting unit 602 can select one local region by combining the selection criteria of the local region in the local region selecting unit 114 according to the first embodiment, the local region selecting unit 502 according to the fifth embodiment, and the local region selecting unit 404 according to the fourth embodiment.

The selecting condition according to the sixth embodiment is not limited to the sixth condition, and may be a condition combining arbitrary conditions of the first condition to the fifth condition. One example of the method of selecting the local region based on the sixth condition in the local region selecting unit 602 will be described below.

[One Example of Method of Selecting a Local Region in the Local Region Selecting Unit 602]

FIG. 13 is an explanatory view describing one example of the method of selecting a local region in the image determining device 600 according to the sixth embodiment of the present invention. FIG. 13 shows a case where the image indicated by the image signal is divided into five local regions, and the reliability of the local regions 1 to 4 is set high and the reliability of the local region 5 is set low in the local region reliability setting unit 112.

The local region selecting unit 602 can select the local region through the following processes (a) to (f).

(a) Exclude Selecting Target (Determine Condition 6-1)

First, the local region selecting unit 602 excludes the local region which reliability is set low from the selecting target based on the reliability (third reliability) of each local region set by the local region reliability setting unit 112. In FIG. 13, an example where the following processes (b) to (e) are not performed on the local region 5 which reliability is set low, that is, an example where the local region 5 is excluded from the selecting target is shown.

(b) Selection Criteria 1: Determine Magnitude of Relative Value (Determine Condition 6-2)

The local region selecting unit 602 calculates the relative value for each local region determined as satisfying the determination of the condition 6-1 in the process of (a). The local region selecting unit 602 then grades each local region according to the relative value of each calculated local region. In FIG. 13, an example where higher grades are given in the order of large relative values based on the equation "grade= (number of local regions of high reliability)−(rank of magnitude of relative value)" is shown, but is not limited thereto.

The grades set in each local region in the process of (b) can be stored in the storage unit of the local region selecting unit 602. The storage unit arranged in the local region selecting unit 602 may be a volatile memory such as SDARAM (Synchronous Dynamic Random Access Memory), SRAM (Static Random Access Memory), and the like, but is not limited thereto and may be a non-volatile memory such as flash memory.

(c) Selection Criteria 2: Determination of Distance from the Center Point of the Image (Determination of Condition 6-3)

The local region selecting unit 602 calculates the distance from the center point of the image for each local region determined as satisfying the determination of the condition 6-1 in the process of (a). The local region selecting unit 602 grades each local region according to the value of the distance from the center point of the image in each calculated local region. In FIG. 13, an example where greater grades are given in the order of small value of distance from the center point of the image based on the equation "grade=(number of local regions of high reliability)−(order of distance from the center point in the image)" is shown, but is not limited thereto. The grades set to each local region in the process of (c) may be recorded in the storage unit of the local region selecting unit 602.

(d) Selection Criteria 3: Determination of Difference with Brightness Reference Value (Determination of Condition 6-4)

The local region selecting unit 602 calculates the difference between the brightness value set by the brightness value setting unit 402 and the brightness reference value for each local region determined as satisfying the determination of the condition 6-1 in the process of (a). The local region selecting unit 602 grades each local region according to the value of the difference between the brightness value in each calculated local region and the brightness reference value. In FIG. 13, an example where greater grades are given in the order of small value of difference between the brightness value and the brightness reference value based on the equation "grade= (number of local regions of high reliability)−(order of difference between brightness value and brightness reference value)" is shown, but is not limited thereto. The grades set to each local region in the process of (d) may be recorded in the storage unit of the local region selecting unit 602.

(e) Setting of Selection Criteria Value

The local region selecting unit 602 sets the selection criteria value to use for the selection of the local region based on the grade set to each local region in each process of (b) to (d). In FIG. 13, an example where the selection criteria value is set based on the equation "selection criteria value=(grade set in selection criteria 1)+(grade set in selection criteria 2)+(grade set in selection criteria 3)" is shown. The setting unit of the selection criteria value is not limited thereto, and the selection criteria value may be set after weighting each selection criteria.

(f) Selection of Local Region

The local region selecting unit 602 selects the local region based on the selection criteria value set in the process of (e). In the example of FIG. 13, the local region 3 set with the largest selection criteria value is selected. The selection of the local region according to the sixth embodiment of the present invention is not limited to the above, and the local region set with the smallest selection criteria value may be selected depending on the manner of grading in each selection criteria. If the local region with the largest selection criteria value exists in plurals, the local region selecting unit 602 can select one local region according to the predetermined priority (e.g., ascending order etc. of the local region number) of the local region.

The local region selecting unit 602 can select one local region through the processes (a) to (f).

The local region selecting unit 602, for instance, outputs an index number corresponding to the selected local region. The local region selecting unit 602 outputs an index number corresponding to the local region (selected local region) satisfying the sixth condition using a look up table in which the local region and the index number of the local region are corresponded to each other.

Therefore, the image determining device 600 can perform image determination on the local region satisfying the sixth condition in the local region selecting unit 602.

Similar to the image determining device 400 according to the fourth embodiment, the image determining device 600 according to the sixth embodiment of the present invention uses the difference in the frequency amplitude characteristic between the image of HD resolution and the image of pseudo-HD resolution as shown in FIG. 2 to perform determination of the image based on the relative value of the average value of the amplitude characteristic value in the mid-range frequency band with respect to the average value of the amplitude characteristic value in the low-range frequency band.

Therefore, the image determining device 600 according to the sixth embodiment does not necessarily require the addition of the side panel when the image of the SD resolution is up-converted as in the image determining device of the related art, and can perform determination of the image regardless of with which up-conversion method the image was up-converted.

The image determining device 600 divides the image indicated by the image signal to a plurality of local regions, and uses a plurality of image information to select the region in which the possibility the statistically important information exists is high. The image determining device 600 then can perform image determination on the selected local region.

Therefore, similar to the image determining device 400 according to the fourth embodiment, the image determining device 600 can alleviate the processes related to image determination and reduce the resources related to image determination compared to when performing image determination on all the local regions. The image determining device 400 can perform image determination based on the "region in which the possibility the statistically important information exists is high", and thus when correcting the image using the image determination result determined by the image determining device 600, for example, correction corresponding to the "region in which the possibility the statistically important information exists is high" can be performed on the image.

Furthermore, similar to the image determining device 400 according to the fourth embodiment, the image determining device 600 sets, for each local region, the "reliability (third reliability)" set based on the factors that lower the reliability of the determination result of the image or (1) number of samples of the amplitude characteristic value and (2) value of average value of the amplitude characteristic value. The image determining device 600 can select the local region to perform image determination based on the "reliability" set for each local region.

Therefore, the image determining device 600 can reduce erroneous determination in the determination of the image.

[Variant of Image Determining Device 600 According to the Sixth Embodiment]

In the image determining device 600 according to the sixth embodiment described above, a configuration where the local region selecting unit 602 selects one local region, and calculates the relative value with respect to the selected local region to perform image determination has been described. However, the image determining device according to the sixth embodiment of the present invention is not limited to such configuration. The image determining device according to the variant of the sixth embodiment may select a plurality of local regions and perform image determination, similar to the variant of the image determining device according to the fourth embodiment.

The image determining device according to the variant of the sixth embodiment may select a plurality of local regions in the order of large selection criteria value set in each local region, but the selecting unit is not limited thereto.

(Program Related to Image Determination)

The determination of image can be performed regardless of with which up-conversion method the image was up-converted by a program for causing a computer to function as the image determining device 600 according to the sixth embodiment of the present invention.

(Seventh Embodiment)

In the image determining device according to the first to the sixth embodiments of the present invention, a configuration including the number-of-samples reliability setting unit 108, the average value reliability setting unit 110, and the local region reliability setting unit 112, and setting the reliability of each local region to use for the selection of the local region has been described. However, the image determining device according to the embodiment of the present invention is not limited to the configuration of setting the reliability of each local region to use for the selection of the local region.

Even with the configuration described above, similar to the image determining device 100 according to the first embodiment, the image determining device according to a seventh embodiment uses the difference in frequency amplitude characteristic of the image of HD resolution and the image of pseudo-HD resolution as shown in FIG. 2 to perform determination of image based on the relative value of the average value of the amplitude characteristic value in the mid-range frequency band with respect to the average value of the amplitude characteristic value in the low-range frequency band.

Therefore, the image determining device according to the seventh embodiment does not necessarily require the addition of the side panel when the image of the SD resolution is up-converted as in the image determining device of the related art, and can perform determination of the image regardless of with which up-conversion method the image was up-converted.

Similar to the image determining device 100 according to the first embodiment, the image determining device according to the seventh embodiment divides the image indicated by the image signal into a plurality of local regions, and uses the image information to select the local region. Furthermore, the image determining device according to the seventh embodiment can perform image determination on the selected local region.

Therefore, similar to the image determining device 100 according to the first embodiment, the image determining device according to the seventh embodiment can alleviate the processes related to image determination and reduce the resources related to image determination compared to when performing image determination on all the local regions.

(Program Related to Image Determination)

The determination of image can be performed regardless of with which up-conversion method the image was up-converted by a program for causing a computer to function as the image determining device according to the seventh embodiment of the present invention.

The image determining device has been described by way of example for the first to the seventh embodiments of the present invention, but the first to the seventh embodiments of the present invention are not limited thereto, and may be applied to display devices such as television receiver, organic EL display (also referred to as organic electro-luminescence display), FED (Field Emission Display), and PDP (Plasma Display Panel), computers such as PDA (Personal Digital Assistants) and UMPC (Ultra Mobile Personal Computer), portable communication devices such as portable telephone and PHS (Personal Handyphone System), and the like.

(Image Determining Method)

Figure 14:
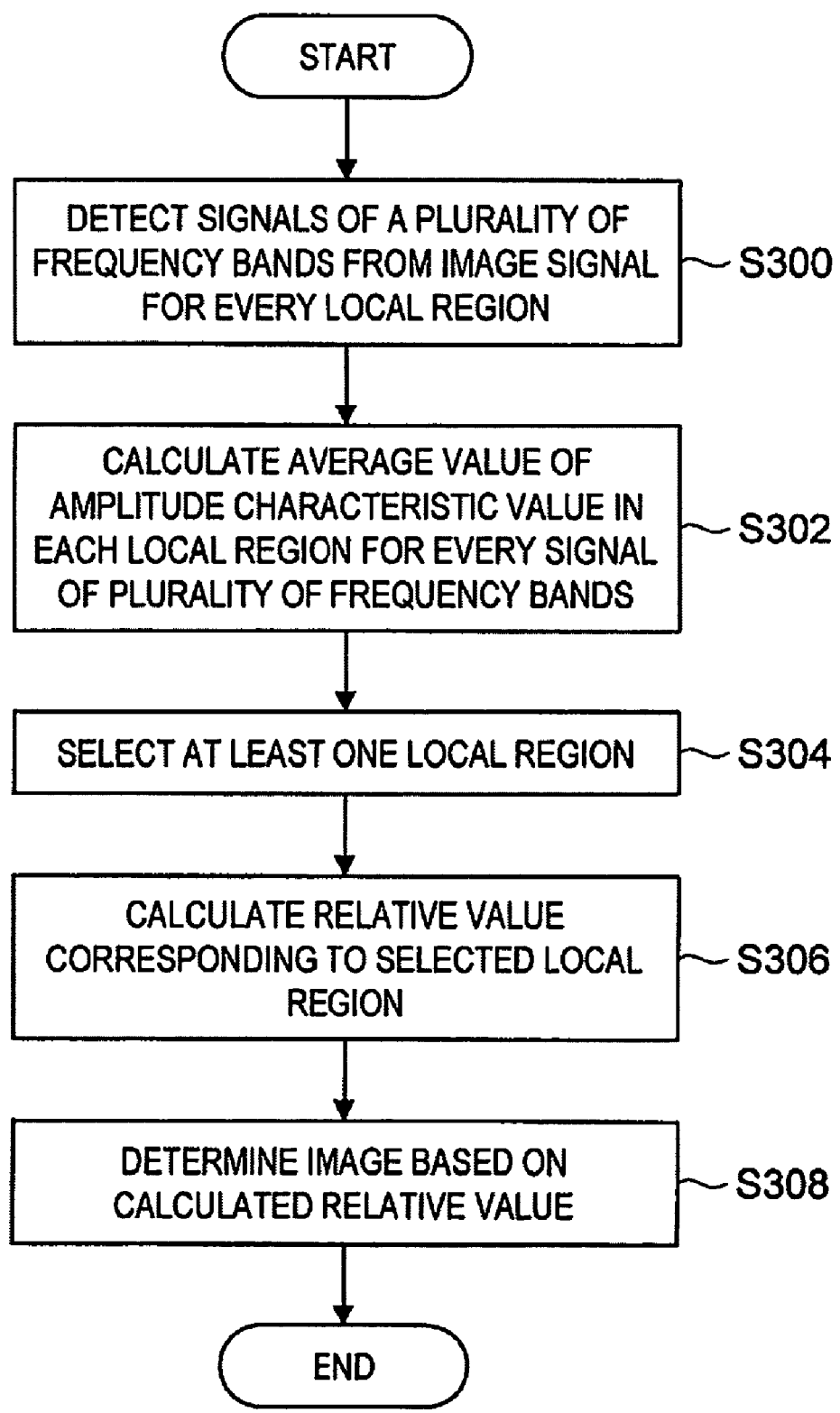
FIG. 14 is a flowchart showing an image determining method according to the embodiment of the present invention.

An image determining method according to the embodiment of the present invention will now be described. FIG. 14 is a flowchart showing one example of the image determining method according to the embodiment of the present invention.

First, the image determining device detects signals of a plurality of frequency bands from the input image signal for each local region (S300). The detection of signals may be performed for each pixel. Each local region may be a predetermined fixed region, or may be appropriately set according to the user input.

The image determining device calculates an average value of the amplitude characteristic value in each local region for each signal of the plurality of frequency bands detected for each pixel in step S300 (S302). The amplitude characteristic value may be may be the amplitude itself, or may be the power spectrum. The method of calculating the average value is not limited to arithmetic average and various calculation methods such as geometric average, or weighted average may be used.

The image determining device selects at least one local region from the plurality of local regions (S304). The selection of local region in step S304 may be carried out so as to satisfy the first condition to the sixth condition (when selecting one local region).

The image determining device calculates a relative value of another average value with respect to one average value of the average values calculated for each signal of the plurality of frequency bands in the local region selected in step S304 (S306). Here, the relative value can be obtained by dividing the another average value by the one average value, or may be obtained by subtracting a value of the logarithm of the one average value from a value of the logarithm of the another average value.

The image determining device determines the image based on the relative value calculated in step S306 (S308). If one local region is selected in step S304, the image determining device can determine the image based on whether or not the relative value in the one local region calculated in S306 is greater than or equal to the predetermined threshold value. If a plurality of local regions is selected in step S304, the image determining device can determine whether or not the relative value is greater than or equal to the predetermined value for each relative value calculated in S306, and determine the image using the result in which the total number of determination results is large.

As shown in step S300 to step S308 described above, the image determining method according to the embodiment of the present invention uses the difference in frequency amplitude characteristic of the image of HD resolution and the image of pseudo-HD resolution as shown in FIG. 2 to perform determination of image based on the relative value of the average value of the amplitude characteristic value in the mid-range frequency band with respect to the average value of the amplitude characteristic value in the low-range frequency band.

Therefore, the image determining method according to the embodiment of the present invention does not necessarily require the addition of the side panel in time of up-conversion as in the image determining method of the related art, and can perform determination of the image regardless of with which up-conversion method the image was up-converted.

The image determining method according to the embodiment of the present invention divides the image indicated by the image signal into a plurality of local regions and uses the image information to select the region in which the possibility the important information exists is high. The image determining method according to the embodiment of the present invention can perform image determination on the selected local region.

Therefore, the image determining device using the image determining method according to the embodiment of the present invention can alleviate the processes related to image determination and reduce the resources related to image determination compared to when performing image determination on all the local regions.

It should be understood by those skilled in the art that various modifications, combinations, sub-combinations and alterations may occur depending on design requirements and other factors insofar as they are within the scope of the appended claims or the equivalents thereof.

In the image determining device according to the first to the seventh embodiments of the present invention, a configuration of arranging the average value calculating unit for calculating the average value has been described, but it is not limited to such configuration, and a median calculating unit for calculating a median may be arranged. The image determining device can still perform image determination since the difference in frequency amplitude characteristic of the image of HD resolution and the image of pseudo-HD resolution as shown in FIG. 2 can be used even if the calculation of the relative value can be made using the median instead of the average value.

In the image determining device according to the first to the seventh embodiments of the present invention, a configuration including the noise removing unit has been described, but it is not limited thereto and a configuration not including the noise removing unit may be adopted. As described above, since the image determining device according to the embodiment of the present invention performs image determination using the difference in frequency amplitude characteristic of the image of HD resolution and the image of pseudo-HD resolution as shown in FIG. 2, determination of image can be performed regardless of with which up-conversion method the image was up-converted even if influenced by noise.

The image determining device according to the first to the seventh embodiments of the present invention shows a configuration in which the frequency band signal detecting unit filters the image signal with the first frequency band detecting part and the second frequency band detecting part, but the embodiments of the present invention are not limited to such configuration. In the image determining device according to the embodiments of the present invention, the frequency band signal detecting unit may include the first frequency band detecting part to the nth frequency band detecting part (here, n is an integer greater than or equal to three), and the HD degree (relative value) shown in Equation 1 may be calculated in plurals based on the image signal filtered by the plurality of frequency band detecting parts. In such configuration as well, the difference in the frequency amplitude characteristic between the image of HD resolution and the image of pseudo-HD resolution as shown in FIG. 2 can be used, and thus the image determining device can perform determination of image. As the image determining method using the HD degree (relative value) calculated in plurals, the total number of relative values in which the HD degree (relative value) is smaller than the predetermined value and the total number of HD degrees (relative value) in which the HD degree (relative value) is greater than or equal to the predetermined threshold value may be compared, and determination may be performed depending on which total number is larger, but the method is not limited thereto.

Furthermore, the image determining device according to the first to the sixth embodiments shows a configuration of using the reliability (third reliability) of each local region for the selection of the average value, but is not limited to such configuration, and the reliability in the selected local region can be output to an external device (e.g., image processor for processing the image subjected to image determination by the image determining device).

The configuration described above show one example of the embodiment of the present invention, and obviously falls within the technical scope of the invention.

What is claimed is:

1. An image determining device comprising:
   a frequency band signal detecting unit for dividing an image indicated by an image signal into a plurality of local regions and detecting for each local region signals of a plurality of frequency bands from the image signal;
   an average value calculating unit for calculating an average value of a characteristic value corresponding to an amplitude, for each local region and for each signal of the plurality of frequency bands detected by the frequency band signal detecting unit;
   a local region selecting unit for selecting at least one local region based on image information of one or more image signals;
   an average value selecting unit for selecting the average value corresponding to the local region selected in the local region selecting unit;
   a relative value calculating unit for calculating a relative value of one average value with respect to another average value, both of the average values being of the average values for each of the plurality of frequency bands selected in the average value selecting unit; and
   an image determining unit for determining an image based on the relative value calculated by the relative value calculating unit.

2. The image determining device according to claim 1, further comprising:
   a number-of-samples reliability setting unit for setting a first reliability with respect to the number of samples of the characteristic value, for each local region and for each signal of the plurality of frequency bands detected by the frequency band signal detecting unit;
   an average value reliability setting unit for setting a second reliability with respect to the average value for each local region calculated by the average value calculating unit; and
   a local region reliability setting unit for setting a third reliability with respect to the local region for each local region based on the first reliability and the second reliability; wherein
   the local region selecting unit selects at least one local region based further on the third reliability.

3. The image determining device according to claim 2, wherein
   the local region selecting unit selects, based on an Euclidean distance from a predetermined reference position, at least one local region from the local regions in which the third reliability indicates a value greater than or equal to a predetermined threshold value.

4. The image determining device according to claim 1, wherein
   the image information is the average value of each of the plurality of frequency bands in each local region calculated by the average value calculating unit; and
   the local region selecting unit calculates for each local region the relative value corresponding to the image information, and selects at least one local region based on the relative value for each local region.

5. The image determining device according to claim 1, wherein
   the image information is one average value calculated by the average value calculating unit for the plurality of frequency bands and for each local region; and
   the local region selecting unit selects at least one local region based on a magnitude of the one average value for each local region.

6. The image determining device according to claim 1, wherein
   the image information is the number of samples of the characteristic value for the plurality of frequency bands and for each local region; and
   the local region selecting unit selects at least one local region based on the number of samples for each local region.

7. The image determining device according to claim 1, further comprising:
   a brightness value setting unit for setting a brightness value based on luminance information from the image signal for each local region; wherein
   the local region selecting unit selects at least one local region based on the brightness value for each local region.

8. The image determining device according to claim 1, wherein the relative value calculating unit calculates the relative value, based on the average value calculated for a predetermined frequency band and the average value calculated for a higher frequency band than the predetermined frequency band.

9. The image determining device according to claim 8, wherein
- a lower limit frequency of the predetermined frequency is lower than a theoretically effective upper limit frequency, according to an up-conversion method, corresponding to a Nyquist frequency of an image up-converted from an image of standard definition; and
- a lower limit frequency of the higher frequency band is higher than the theoretically effective upper limit frequency, according to the up-conversion method, corresponding to the Nyquist frequency of the image up-converted from the image of standard definition.

10. An image determining method comprising the steps of:
- dividing an image indicated by an image signal into a plurality of local regions, and detecting for each local region signals of a plurality of frequency bands from the image signal;
- calculating an average value of a characteristic value corresponding to an amplitude, for each local region and for each signal of the plurality of frequency bands detected in the detecting step;
- selecting at least one local region based on image information of one or more image signals;
- selecting the average value corresponding to the local region selected in the step of selecting the local region;
- calculating a relative value of one average value with respect to another average value, both of the average values being of the average values for each of the plurality of frequency bands selected in the step of selecting the average value; and
- determining an image based on the relative value calculated in the step of calculating the relative value.

11. A non-transitory computer-readable medium having stored therein a program for causing a computer to execute the steps of:
- dividing an image indicated by an image signal into a plurality of local regions, and detecting for each local region signals of a plurality of frequency bands from the image signal;
- calculating an average value of a characteristic value corresponding to an amplitude, for each local region and for each signal of the plurality of frequency bands detected in the detecting step;
- selecting at least one local region based on image information of one or more image signals;
- selecting the average value corresponding to the local region selected in the step of selecting the local region;
- calculating a relative value of one average value with respect to another average value, both of the average values being of the average values for each of the plurality of frequency bands selected in the step of selecting the average value; and
- determining an image based on the relative value calculated in the step of calculating the relative value.

* * * * *